United States Patent
He et al.

(10) Patent No.: US 11,221,274 B1
(45) Date of Patent: Jan. 11, 2022

(54) LIGHT SCATTERING PARAMETER MEASUREMENT SYSTEM AND ITS MEASUREMENT METHOD

(71) Applicant: Peking University, Beijing (CN)

(72) Inventors: Xiangge He, Beijing (CN); Min Zhang, Beijing (CN); Fei Liu, Beijing (CN); Lijuan Gu, Beijing (CN); Hailong Lu, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 17/117,098

(22) Filed: Dec. 9, 2020

(51) Int. Cl.
*G01H 9/00* (2006.01)
*G01M 11/00* (2006.01)
*G01M 11/02* (2006.01)

(52) U.S. Cl.
CPC ...... *G01M 11/319* (2013.01); *G01M 11/0207* (2013.01)

(58) Field of Classification Search
CPC .......... G01D 5/35361; G01D 5/35358; G01D 5/35354; G01D 5/5306; G01H 9/004; G01K 11/32; G01L 1/243; G02B 6/4415; G02B 6/4432; G02B 6/4433
USPC ............ 356/73.1, 477, 479, 497; 385/12–27, 385/114–120; 250/227.11–227.27
See application file for complete search history.

(56) References Cited

U.S. PATENT DOCUMENTS

| | | | | |
|---|---|---|---|---|
| 2017/0292862 A1* | 10/2017 | Godfrey | ............... | G02B 6/4415 |
| 2019/0013862 A1* | 1/2019 | He | ......... | H04B 10/071 |
| 2020/0149952 A1* | 5/2020 | Hveding | ............ | H01S 3/08013 |
| 2020/0209020 A1* | 7/2020 | Issa | ......... | G01B 11/18 |

* cited by examiner

*Primary Examiner* — Hoa Q Pham
(74) *Attorney, Agent, or Firm* — SV Patent Service

(57) ABSTRACT

The application discloses a light scattering parameter measurement system and its measurement method. Dual-frequency scattering interference technology is adopted to obtain distributed measurement of Rayleigh scattering parameters in an optical fiber. The Rayleigh scattering coefficient r and phase retardance θ are modulated on different components of the interference signal respectively by using the dual-frequency interference technology. The Rayleigh scattering coefficient r and phase retardance θ can be decoupled by simple filtering, to obtain separate measurements. A linear stretch is applied to the optical fiber under test, to add uniform phase change signals at all positions of the optical fiber under test. As a result, the term containing only Rayleigh scattering coefficient r can be extracted by low-pass filtering. The direct measurement of Rayleigh scattering parameters is of great significance to fundamental and application researches related to Rayleigh scattering of optical fiber.

19 Claims, 2 Drawing Sheets

LIGHT SCATTERING PARAMETER MEASUREMENT SYSTEM AND ITS MEASUREMENT METHOD

TECHNICAL FIELD

The invention relates to optical fiber measurement and sensing technology, in particular to a light scattering parameter measurement system and a measurement method.

BACKGROUND OF THE INVENTION

When the light wave propagates in the medium, it will interact with the atoms and molecules, and its electric field will induce a polarized dipole, which will further produce a secondary wave, which is the scattering of light. When the medium is completely uniform, only forward scattering light will be produced. However, for optical fiber, residual stress will be introduced in the process of drawing and coating, which will lead to the inhomogeneity of optical fiber geometry and material density. In addition, there are also processes such as doping, which further lead to the non-uniformity of the fiber. Thus, Rayleigh scattering will occur in the optical fiber, which is inversely proportional to the fourth power of the wavelength (Bao X, Chen L. Recent Progress in Distributed Fiber Optic Sensors. Sensors, 2012, 12(7): 8601). Rayleigh scattering is elastic scattering, because there is no change in the frequency of the scattered light compared with the incident light.

Rayleigh scattering is an inherent physical phenomenon in optical fiber, and has important applications in distributed sensing (Chen D, Liu Q, Wang Y, et al. Fiber-optic distributed acoustic sensor based on a chirped pulse and a non-matched filter. Optics Express, 2019, 27(20): 29415~29424), ultra-narrow linewidth fiber laser (Zhu T, Zhang B, Shi L, et al. Tunable dual-wavelength fiber laser with ultra-narrow linewidth based on Rayleigh backscattering. Optics Express, 2016, 24(2): 1324~1330) and high precision wavelength meter (Wan Y, Wang S, Fan X, et al. High-resolution wavemeter using Rayleigh speckle obtained by optical time domain reflectometry. Optics Letters, 2020, 45(4): 799). In these applications, the randomness of Rayleigh scattering is concerned, including Rayleigh scattering coefficient and phase retardance. However, these applications are limited to measure the derivative parameters of Rayleigh scattering, such as spatial interference fringes, incoherent intensity, etc. The realization of direct measurement of Rayleigh scattering parameters of optical fiber can produce a deeper understanding of the physical mechanism of the above-mentioned systems, and can also derive new sensing mechanisms. At present, there is no report on the method and results of distributed measurement of Rayleigh scattering parameters of optical fiber.

SUMMARY OF THE INVENTION

For existing technology that existed in the inadequacies, this invention proposes a light scattering parameter measurement system and a measurement method.

One objective of this invention is to disclose a light scattering parameter measurement system.

The light scattering parameter measurement system of this invention adopts dual-frequency scattering interference to measure Rayleigh scattering parameters in the optical fiber, which can be obtained in four ways: dual-pulse scattering interference, dual-pulse scattering interference while the pulse width is twice the length of the slice, single pulse scattering and interfere with local light, or single pulse scattering and interfere with local light while the pulse width is twice the length of the slice.

Dual-pulse scattering interference. The light scattering parameter measurement system of the invention comprises: light source, modulation unit, optical amplification and filtering unit, circulator, optical fiber stretching device, sound insulation and vibration isolation device, signal generator, detector, data acquisition unit and computer. The light source emits continuous light with frequency $f_0$, which is modulated into two pulses through the modulation unit. The frequencies of the former and latter pulses are $f_1$ and $f_2$ respectively, which is called a pulse pair. The pulse pair is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber. The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer. The interference intensity of Rayleigh backscattering light is processed by computer using distributed measurement. The optical fiber under test is composed of randomly distributed scattering particles, whose diameter is far less than the wavelength of incident light. Slice model with particle collection is used: The sampling rate of the data acquisition unit is $f_a$, and the forward transmission distance of the pulse pair is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. If the total length of the optical fiber under test is L and the length of each slice is $\delta l$, the optical fiber under test is divided into $M = L/\delta l$ slices, and the Rayleigh scattering parameters of the m-th slice are $r_m$ and $\theta_m$, where m=1, 2, ..., M. The Rayleigh scattering coefficient r and the phase retardance $\theta$ are modulated on different terms of the interference intensity of Rayleigh backscattering light by interference modulation. The optical fiber stretching device applies a linear stretch to the optical fiber under test, so as to add uniform phase change signals at all positions of the optical fiber under test. As a result, the average value of the terms related to the Rayleigh scattering phase retardance $\theta$ in the interference intensity of Rayleigh backscattering light is zero. The DC term of the interference intensity of Rayleigh backscattering light is obtained by low-pass filtering, which is only related to the Rayleigh scattering coefficient r. Thus, the Rayleigh scattering coefficient r and the phase retardance $\theta$ are decoupled by filtering to obtain the separate measurement of the two. The low-pass filter is used for each slice, and the DC term of interference intensity of each slice is obtained one by one, thus a matrix of the square value of Rayleigh scattering coefficient r versus DC light intensity is obtained. The matrix is solved to obtain the Rayleigh scattering coefficient r at different positions of the optical fiber under test. Then place the optical fiber under test in the sound insulation and vibration isolation device, so the phase change caused by external vibration is zero. The interference intensity of Rayleigh backscattering light is mixed with specific signals, and then through a low-pass filter. Combined with the obtained Rayleigh scattering coefficient r, the Rayleigh scattering phase retardance θ at different positions of the optical fiber under test is obtained by matrix operation.

The optical fiber stretching device adopts piezoelectric ceramic transducer, which expands and contracts linearly by applying a linear voltage to the piezoelectric ceramic transducer, so as to drive the elongation and shortening of the optical fiber. Moreover, the optical fiber stretching device adopts elastic device or mechanical device.

Dual-pulse scattering interference while the pulse width is twice the length of the slice. The light scattering parameter measurement system of the invention comprises: light source, modulation unit, optical amplification and filtering unit, circulator, sound insulation and vibration isolation device, detector, data acquisition unit and computer. The light source emits continuous light with frequency $f_0$, which is modulated into two pulses through the modulation unit. The frequencies of the former and latter pulses are $f_1$ and $f_2$ respectively, which is called a pulse pair. The pulse pair is amplified and filtered by the optical amplification and filtering unit, and then injected into the first port of the circulator, and the second port of the circulator is connected with the optical fiber under test. The optical fiber under test is placed in the sound insulation and vibration isolation device. The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer. The interference intensity of Rayleigh backscattering light is processed by computer using distributed measurement. The optical fiber under test is composed of randomly distributed scattering particles, whose diameter is far less than the wavelength of incident light. Slice model with particle collection is used: The sampling rate of the data acquisition unit is $f_a$, and the forward transmission distance of the pulse pair is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. If the total length of the optical fiber under test is L and the length of each slice is $\delta l$, the optical fiber under test is divided into $M = L/\delta l$ slices. The number of slices covered by a single pulse width is $M_w = w/\delta l$, and the relationship between the pulse width w and the sampling rate $f_a$ of the data acquisition unit is $wf_a = 2c/n_r$, that is the pulse width is twice the length of the slice, i.e. $M_w = 2$. The Rayleigh scattering parameters of the m-th slice are $r_m$ and $\theta_m$, where m=1, 2, . . . , M. The Rayleigh scattering coefficient r and the phase retardance θ are modulated on different terms of the interference intensity of Rayleigh backscattering light by interference modulation. Because the optical fiber under test is placed in the sound insulation and vibration isolation device, the phase change caused by external vibration is zero, which makes the average value of the terms related to the Rayleigh scattering phase retardance θ in the interference intensity of Rayleigh backscattering light is zero. The DC term of the interference intensity of Rayleigh backscattering light is obtained by low-pass filtering, which is only related to the Rayleigh scattering coefficient r. Thus, the Rayleigh scattering coefficient r and the phase retardance θ are decoupled by filtering to obtain the separate measurement of the two. The low-pass filter is used for each slice, and the DC term of interference intensity of each slice is obtained one by one, thus a matrix of the square value of Rayleigh scattering coefficient r versus DC light intensity is obtained. The matrix is solved to obtain the Rayleigh scattering coefficient r at different positions of the optical fiber under test. The interference intensity of Rayleigh backscattering light is mixed with specific signals, and then through a low-pass filter. Combined with the obtained Rayleigh scattering coefficient r, the Rayleigh scattering phase retardance θ at different positions of the optical fiber under test is obtained by matrix operation.

In the dual-pulse scattering interference, the modulation unit can have three implementations: a single acousto-optic modulator is used, two acousto-optic modulators and a single semiconductor optical amplifier are used, and two acousto-optic modulators and two semiconductor optical amplifiers are used. When a single acousto-optic modulator is used, the modulation unit includes a driver and an acousto-optic modulator. The driver is connected with the acousto-optic modulator. The input is directly connected to the input port of the acousto-optic modulator. Two pulse signals with frequency shift and time delay are generated by the driver to drive the acousto-optic modulator. The driver generates an electric driving signal, and the output of the acousto-optic modulator is a pulse pair with frequency $f_1$ and $f_2$, and the width of the pulse is w. When two acousto-optic modulators and a single semiconductor optical amplifier are used, the modulation unit includes semiconductor optical amplifier, first and second couplers, first and second acousto-optic modulators, delay fiber and driver. The semiconductor optical amplifier is connected to the first and the second acousto-optic modulators by the first couple. The output end of the second acousto-optic modulator, which is connected with a delay fiber, and the output end of the first acousto-optic modulator are connected to the second coupler. The driver is connected to the semiconductor optical amplifier, the first and the second acousto-optic modulators. The input is firstly modulated into pulse signals by the semiconductor optical amplifier, and then divided into two channels through the first coupler, one through the first acousto-optic modulator, the other through the second acousto-optic modulator and a length of delay fiber. The length of the delay fiber is w. The two channels are combined into one output through the second coupler, and the output is a pulse pair. The driver controls the semiconductor optical amplifier to generate pulse signal, and controls the first and the second acousto-optic modulators to shift the frequency of the light wave. The frequencies of the lights of the two channels are $f_1$ and $f_2$ respectively. When two acousto-optic modulators and two semiconductor optical amplifiers are used, the modulation unit includes first and second semiconductor optical amplifiers, first and second couplers, first and second acousto-optic modulators and driver. The output ports of the first coupler are respectively connected to the first and the second acousto-optic modulators, and the first and the second acousto-optic modulators are respectively connected to the first and the second semiconductor optical amplifiers. The output ports of the first and the second semiconductor optical amplifiers are connected to the second coupler, and the driver is respectively connected to the first and the second acousto-optic modulators and the first and the second semiconductor optical amplifiers. The input is divided into two channels through the first coupler. Channel one generates frequency shift by the first acousto-optic modulator and modulates the light into pulse by the first semiconductor optical amplifier. Channel two generates frequency shift by the second acousto-optic modulator and modulates the light into pulse by the second semiconductor optical amplifier. The time of pulse generation is controlled by the driver so that the two pulses have a delay time. The pulse sent by the driver to the second semiconductor optical amplifier is delayed by w than the pulse sent to the first semiconductor optical amplifier. After that, the two channels are combined into one output through the second coupler, and the output is a pulse pair. The frequencies of the lights of the two channels are $f_1$ and $f_2$ respectively.

Single pulse scattering and interfere with local light. The light scattering parameter measurement system of the invention comprises: light source, driver, first and second couplers, first and second acousto-optic modulators, semiconductor optical amplifier, optical amplification and filtering unit, circulator, optical fiber stretching device, sound insulation and vibration isolation device, signal generator, detector, data acquisition unit and computer. The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber. The other channel is frequency shifted by the second acousto-optic modulator as the local light. The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w. The Rayleigh backscattering light generated by the optical fiber under test reaches the second coupler through the third port of the circulator, and the output of the second acousto-optic modulator also reaches the second coupler. The two beams interfere with each other, which is detected by the detector. The interference intensity of Rayleigh backscattering light and local light is collected by the data acquisition unit and transmitted to the computer. The interference intensity of Rayleigh backscattering light and local light is processed by computer using distributed measurement. The optical fiber under test is composed of randomly distributed scattering particles, whose diameter is far less than the wavelength of incident light. Slice model with particle collection is used: The sampling rate of the data acquisition unit is $f_a$, and the forward transmission distance of the pulse is $\delta l=c/(n_r f_a)$ at each sampling, where c is the speed of light in vacuum and $n_r$ is the refractive index of the optical fiber. Taking this transmission distance as the length of a slice, the optical fiber under test is divided into many slices. If the total length of the optical fiber under test is L and the length of each slice is $\delta l$, the optical fiber under test is divided into $M=L/\delta l$ slices, and the Rayleigh scattering parameters of the m-th slice are $r_m$ and $\theta_m$, where m=1, 2, ..., M. The Rayleigh scattering coefficient r and the phase retardance $\theta$ are modulated on different terms of the interference intensity of Rayleigh backscattering light and local light by interference modulation. The optical fiber stretching device applies a linear stretch to the optical fiber under test, so as to add uniform phase change signals at all positions of the optical fiber under test. As a result, the average value of the terms related to the Rayleigh scattering phase retardance $\theta$ in the interference intensity of Rayleigh backscattering light and local light is zero. The DC term of the interference intensity of Rayleigh backscattering light and local light is obtained by low-pass filtering, which is only related to the Rayleigh scattering coefficient r. Thus, the Rayleigh scattering coefficient r and the phase retardance $\theta$ are decoupled by filtering to obtain the separate measurement of the two. The low-pass filter is used for each slice, and the DC term of interference intensity of each slice is obtained one by one, thus a matrix of the square value of Rayleigh scattering coefficient r versus DC light intensity is obtained. The matrix is solved to obtain the Rayleigh scattering coefficient r at different positions of the optical fiber under test. Then place the optical fiber under test in the sound insulation and vibration isolation device, so the phase change caused by external vibration is zero. The interference intensity of Rayleigh backscattering light and local light is mixed with specific signals, and then through a low-pass filter. Combined with the obtained Rayleigh scattering coefficient r, the Rayleigh scattering phase retardance $\theta$ at different positions of the optical fiber under test is obtained by matrix operation.

Single pulse scattering and interfere with local light while the pulse width is twice the length of the slice. The light scattering parameter measurement system of the invention comprises: light source, driver, first and second couplers, first and second acousto-optic modulators, semiconductor optical amplifier, optical amplification and filtering unit, circulator, sound insulation and vibration isolation device, detector, data acquisition unit and computer. The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is placed in the sound insulation and vibration isolation device. The other channel is frequency shifted by the second acousto-optic modulator as the local light. The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w. The Rayleigh backscattering light generated by the optical fiber under test reaches the second coupler through the third port of the circulator, and the output of the second acousto-optic modulator also reaches the second coupler. The two beams interfere with each other, which is detected by the detector. The interference intensity of Rayleigh backscattering light and local light is collected by the data acquisition unit and transmitted to the computer. The interference intensity of Rayleigh backscattering light and local light is processed by computer using distributed measurement. The optical fiber under test is composed of randomly distributed scattering particles, whose diameter is far less than the wavelength of incident light. Slice model with particle collection is used: The sampling rate of the data acquisition unit is $f_a$, and the forward transmission distance of the pulse is $\delta l=c/(n_r f_a)$ at each sampling, where c is the speed of light in vacuum and $n_r$ is the refractive index of the optical fiber. Taking this transmission distance as the length of a slice, the optical fiber under test is divided into many slices. If the total length of the optical fiber under test is L and the length of each slice is $\delta l$, the optical fiber under test is divided into $M=L/\delta l$ slices. The number of slices covered by a single pulse width is $M_w=w/\delta l$, and the relationship between the pulse width w and the sampling rate $f_a$ of the data acquisition unit is $wf_a=2c/n_r$, that is the pulse width is twice the length of the slice, i.e. $M_w=2$. The Rayleigh scattering parameters of the m-th slice are $r_m$ and $\theta_m$, where m=1, 2, . . . , M. The Rayleigh scattering coefficient r and the phase retardance $\theta$ are modulated on different terms of the interference intensity of Rayleigh backscattering light and local light by interference modulation. Because the optical fiber under test is placed in the sound insulation and vibration isolation device, the phase change caused by external vibration is zero, which makes the average value of the terms related to the Rayleigh scattering phase retardance $\theta$ in the interference intensity of Rayleigh backscattering light and local light is zero. The DC term of the interference intensity of Rayleigh backscattering light and local light is obtained by low-pass filtering, which is only related to the Rayleigh scattering coefficient r. Thus, the Rayleigh scattering coefficient r and the phase retardance $\theta$ are decoupled by filtering to obtain the separate measurement of the two. The low-pass filter is used for each slice, and the DC term of interference intensity of each slice is obtained one by one, thus a matrix of the square value of Rayleigh scattering coefficient r versus DC light intensity is obtained. The matrix is solved to obtain the Rayleigh scattering coefficient r at different positions of the optical fiber under test. The interference intensity of Rayleigh backscattering light and local light is mixed with specific signals, and then through a low-pass filter. Combined with the obtained Rayleigh scattering coefficient r, the Rayleigh scattering phase retardance $\theta$ at different positions of the optical fiber under test is obtained by matrix operation.

Furthermore, in the above four ways, calibration devices are used to calibrate the corresponding relationship between Rayleigh scattering coefficient r and phase retardance $\theta$ and temperature and strain. The calibration devices adopt thermostat and strain stretching device, and the optical fiber under test is placed in the thermostat to calibrate the temperature, and the strain stretching device is used to stretch the optical fiber to calibrate the strain.

Another purpose of this invention is to propose a method for measuring light scattering parameter.

The light scattering parameter measurement method of this invention adopts dual-frequency scattering interference to measure Rayleigh scattering parameters in the optical fiber, including four ways: dual-pulse scattering interference, dual-pulse scattering interference while the pulse width is twice the length of the slice, single pulse scattering and interfere with local light, or single pulse scattering and interfere with local light while the pulse width is twice the length of the slice.

Dual-pulse scattering interference. The light scattering parameter measurement method of the invention comprises the following steps:

1) The light source emits continuous light with frequency $f_0$, which is modulated into two pulses through the modulation unit. The frequencies of the former and latter pulses are $f_1$ and $f_2$ respectively, which is called a pulse pair.

2) The pulse pair is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber.

3) The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer.

4) The interference intensity of Rayleigh backscattering light is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in}a_i\exp[(j(\phi_{in}+\phi_{i0})]$, where $E_{in}$ is the amplitude of the incident light, $\phi_{in}$ is the phase of the incident light, $a_i$ is the scattering coefficient of the i-th scattering particle, and $\phi_{i0}$ is the scattering phase. According to the theory of electric dipole, the scattered light caused by each scattering particle is in phase with the incident light, i.e $\phi_{i0}=0$.

ii. Slice model with particle collection is used: The sampling rate of the data acquisition unit is $f_a$, and the forward transmission distance of the pulse pair is $\delta l=c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i=2\beta z_i$ will be introduced, where $\beta$ is the wave number and $z_i$ is the position of the i-th scattering particle. If the total length of the optical fiber under test is L and the length of each slice is $\delta l$, the optical fiber under test is divided into $M=L/\delta l$ slices, and the Rayleigh scattering parameters of the m-th slice are $r_m$ and $\theta_m$, where m=1, 2, . . . , M. The scattering parameter of the m-th slice is the superposition of scattering particles inside it:

$$r_m e^{j\theta} = \sum_{i=1}^{K} a_i e^{j\phi_i} \qquad (1)$$

where $r_m$ and $\theta_m$ are the Rayleigh scattering coefficient and phase retardance of the m-th slice, and K is the total number of scattering particles in the m-th slice.

iii. The number of slices covered by a single pulse width is $M_w=w/\delta l$. At the time moment $t_0$, the first pulse of the pulse pair completely enters the optical fiber under test, and at the time moment $t_1$, the pulse pair transmits forward a slice. At the time moment $t_M$, the first pulse completely leaves the optical fiber under test. The Rayleigh backscattering light field of the pulse pair is expressed as:

$$E(m,n) = \qquad (2)$$
$$E_2 \sum_{k=m}^{m+M_w/2-1} r_k^n e^{j(\theta_k^n + \Phi_k^n)} \cdot e^{-j\omega_2 n} + E_1 \sum_{k=m+M_w/2}^{m+M_w-1} r_k^n e^{j(\theta_k^n + \Phi_k^n)} \cdot e^{-j\omega_1 n}$$

where n is the discrete sequence of time, i.e. m and n are the discrete sequence of space and time respectively. $E_1$ and $E_2$ are the amplitude of two pulses respectively. $\Phi_k^n$ is the phase change induced by external vibration. $\Delta\omega=2\pi\Delta f=\omega_1-\omega_2$ is the heterodyne angular frequency. $\Delta f=f_1-f_2$ is the heterodyne frequency, and $\omega_1$ and $\omega_2$ are respectively the angular frequency of the first and the second pulses.

iv. The interference intensity of Rayleigh backscattering light of the pulse pair is:

$$I(m, n) = E(m, n) \cdot E(m, n)^* \quad (3)$$

$$= E_2^2 \sum_{k=m}^{m+M_w/2-1} (r_k^n)^2 + E_1^2 \sum_{k=m+M_w/2}^{m+M_w-1} (r_k^n)^2 + \quad (3a)$$

$$2E_2^2 \sum_{k,l=m, l>k}^{m+M_w/2-1} r_k^n r_l^n \cos(\Phi_k^n - \Phi_l^n + \theta_k^n - \theta_l^n) + \quad (3b)$$

$$2E_1^2 \sum_{k,l=m+M_w/2, l>k}^{m+M_w-1} r_k^n r_l^n \cos(\Phi_k^n - \Phi_l^n + \theta_k^n - \theta_l^n) + \quad$$

$$2E_1 E_2 \sum_{i=m}^{m+M_w/2-1} \sum_{j=m+M_w/2}^{m+M_w-1} r_k^n r_l^n \cos[\Delta\omega n + (\Phi_k^n - \Phi_l^n + \theta_k^n - \theta_l^n)] \quad (3c)$$

v. The optical fiber stretching device applies a linear stretch to the optical fiber under test, so as to add uniform phase change signals at all positions of the optical fiber under test. The phase change of the m-th slice is expressed as:

$$\varphi(m,n) = \gamma n \quad (4)$$

where $\gamma$ is the phase change rate, which is determined by the stretching rate of the optical fiber stretching device. The accumulated phase change is expressed as:

$$\Phi_k^n - \Phi_l^n = \sum_{m=1}^{k} 2\varphi(m, n) - \sum_{m=1}^{l} 2\varphi(m, n) = 2(k - l)\gamma n \quad (5)$$

Thus the interference intensity of Rayleigh backscattering light is expressed as:

$$(6)$$

$$I(m, n) = E_2^2 \sum_{k=m}^{m+M_w/2-1} (r_k^n)^2 + E_1^2 \sum_{k=m+M_w/2}^{m+M_w-1} (r_k^n)^2 \quad (6a)$$

$$+ 2E_2^2 \sum_{k,l=m, l>k}^{m+M_w/2-1} r_k^n r_l^n \cos[2(k - l)\gamma n + \theta_k^n - \theta_l^n] \quad (6b)$$

$$+ 2E_1^2 \sum_{k,l=m+M_w/2, l>k}^{m+M_w-1} r_k^n r_l^n \cos[2(k - l)\gamma n + \theta_k^n - \theta_l^n] \quad$$

$$+ 2E_1 E_2 \sum_{i=m}^{m+M_w/2-1} \sum_{j=m+M_w/2}^{m+M_w-1} r_k^n r_l^n \cos[\Delta\omega n + 2(k - l)\gamma n + \theta_k^n - \theta_l^n] \quad (6c)$$

In Eq. (6), The Rayleigh scattering coefficient r and the phase retardance $\theta$ are modulated on different terms of the interference intensity of Rayleigh backscattering light by interference modulation. All the summation terms in Eq. (6b) are cosine functions. By controlling the optical fiber stretching device, $2(k-l)\gamma n$ traverses $[0, 2\pi]$, so that the average value of these cosine functions is zero. All the summation terms in Eq. (6c) are cosine functions as well with the average value zero. As a result, the average value of the terms related to the Rayleigh scattering phase retardance $\theta$ of the interference intensity of Rayleigh backscattering light is zero.

vi. The DC term of interference intensity is obtained when a low-pass filter is added to the interference intensity of Rayleigh backscattering light of Eq. (6):

$$I_{DC}(m, n) = E_2^2 \sum_{k=m}^{m+M_w/2-1} (r_k^n)^2 + E_1^2 \sum_{k=m+M_w/2}^{m+M_w-1} (r_k^n)^2 \quad (7)$$

In Eq. (7), the DC term of the interference intensity is only related to the Rayleigh scattering coefficient r. Thus, the Rayleigh scattering coefficient r and the phase retardance $\theta$ are decoupled by filtering to obtain the separate measurement of the two.

vii. The low-pass filter is used for each slice, and the DC term of interference intensity of each slice is obtained one by one, thus a matrix of the square value of Rayleigh scattering coefficient r versus DC light intensity is obtained:

$$\begin{bmatrix} I_{DC}(1, n) \\ I_{DC}(2, n) \\ M \\ I_{DC}(M-1, n) \\ I_{DC}(M, n) \end{bmatrix} = E_2^2 \begin{bmatrix} 1 & 1 & L & 0 & 0 \\ 0 & 1 & L & 0 & 0 \\ M & M & O & M & M \\ 0 & 0 & L & 1 & 1 \\ 0 & 0 & L & 0 & 1 \end{bmatrix} \begin{bmatrix} (r_1^n)^2 \\ (r_2^n)^2 \\ M \\ (r_{M-1}^n)^2 \\ (r_M^n)^2 \end{bmatrix} + \quad (8)$$

$$E_1^2 \begin{bmatrix} 0 & 1 & L & 0 & 0 \\ 0 & 0 & L & 0 & 0 \\ M & M & O & M & M \\ 0 & 0 & L & 0 & 1 \\ 0 & 0 & L & 0 & 0 \end{bmatrix} \begin{bmatrix} (r_1^n)^2 \\ (r_2^n)^2 \\ M \\ (r_{M-1}^n)^2 \\ (r_M^n)^2 \end{bmatrix}$$

Further written as:

$$I_{DC} = E_2^2 C_2 R + E_1^2 C_1 R = (E_2^2 C_2 + E_1^2 C_1)R = CR \quad (9)$$

where $I_{DC} = [I_{DC}(1,n)\ I_{DC}(2,n)\ L\ I_{DC}(M-1,n)\ I_{DC}(M,n)]^T$ is the DC light intensity at different positions. $R = [(r_1{}^n)^2\ (r_2{}^n)^2\ L\ (r_{M-1}{}^n)^2\ (r_M{}^n)^2]^T$ is the square value of Rayleigh scattering coefficient r at different positions. $C_1$ and $C_2$ are the transmission matrix of the pulse pair.

viii. The square value of Rayleigh scattering coefficient is obtained through the matrix of Eq. (9):

$$R = C^{-1} I_{DC} \quad (10)$$

The Rayleigh scattering coefficient r at different positions of the optical fiber under test is obtained by solving the matrix.

ix. Based on the obtained Rayleigh scattering coefficient r, the optical fiber under test is then placed in the sound insulation and vibration isolation device, so the phase change caused by external vibration is $\Phi_k^n = 0$.

x. Mixing the interference intensity of Rayleigh backscattering light of Eq. (3) with $I_{r1} = \sin(\Delta\omega n)$, and then pass a low-pass filter, the following result is obtained:

$$I_{sr1}(m, n) = -E_1 E_2 \sum_{k=m}^{m+M_w/2-1} \sum_{l=m+M_w/2}^{m+M_w-1} r_k^n r_l^n \sin(\theta_k^n - \theta_l^n) \quad (11)$$

Then mixing the interference intensity of Rayleigh backscattering light of Eq. (3) with $I_{r2}=\cos(\Delta\omega n)$, and then pass a low-pass filter, the following result is obtained:

$$I_{sr2}(m,n) = E_1 E_2 \sum_{k=m}^{m+M_w/2-1} \sum_{l=m+M_w/2}^{m+M_w-1} r_k^n r_l^n \cos(\theta_k^n - \theta_l^n) \quad (12)$$

Combining the obtained Rayleigh scattering coefficient r into Eq. (11) and Eq. (12), the Rayleigh scattering phase retardance θ at different positions of the optical fiber under test is obtained by matrix operation.

Dual-pulse scattering interference while the pulse width is twice the length of the slice. The light scattering parameter measurement method of the invention comprises the following steps:

1) The light source emits continuous light with frequency $f_0$, which is modulated into two pulses through the modulation unit. The frequencies of the former and latter pulses are $f_1$ and $f_2$ respectively, which is called a pulse pair.

2) The pulse pair is amplified and filtered by the optical amplification and filtering unit, and then injected into the first port of the circulator, and the second port of the circulator is connected with the optical fiber under test. The optical fiber under test is placed in the sound insulation and vibration isolation device.

3) The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer.

4) The interference intensity of Rayleigh backscattering light is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in}a_i\exp[j(\phi_{in}+\phi_{i0})]$, where $E_{in}$ is the amplitude of the incident light, $\phi_{in}$ is the phase of the incident light, $a_i$ is the scattering coefficient of the i-th scattering particle, and $\phi_{i0}$ is the scattering phase. According to the theory of electric dipole, the scattered light caused by each scattering particle is in phase with the incident light, i.e $\phi_{i0}=0$.

ii. Slice model with particle collection is used: The sampling rate of the data acquisition unit is $f_a$, and the forward transmission distance of the pulse pair is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i = 2\beta z_i$ will be introduced, where β is the wave number and $z_i$ is the position of the i-th scattering particle. If the total length of the optical fiber under test is L and the length of each slice is $\delta l$, the optical fiber under test is divided into $M=L/\delta l$ slices. The number of slices covered by a single pulse width is $M_w = w/\delta l$, and the relationship between the pulse width w and the sampling rate $f_a$ of the data acquisition unit is $wf_a = 2c/n_r$, that is the pulse width is twice the length of the slice, i.e. $M_w = 2$. The Rayleigh scattering parameters of the m-th slice are $r_m$ and $\theta_m$, where m=1, 2, ..., M. The scattering parameter of the m-th slice is the superposition of scattering particles inside it:

$$r_m e^{j\theta_m} = \sum_{i=1}^{K} a_i e^{j\phi_i} \quad (1)$$

where $r_m$ and $\theta_m$ are the Rayleigh scattering coefficient and phase retardance of the m-th slice, and K is the total number of scattering particles in the m-th slice.

iii. The optical fiber under test is placed in the sound insulation and vibration isolation device, so the phase change caused by external vibration is $\Phi_k^n = 0$. In addition, $wf_a = 2c/n_r$, i.e. the number of slices covered by a single pulse width is $M_w = 2$. The Rayleigh backscattering light field of the pulse pair is expressed as:

$$E(m,n) = E_2 r_m^n e^{j\theta_m^n} \cdot e^{-j\omega_2 n} + E_1 r_{m+1}^n e^{j\theta_{m+1}^n} \cdot e^{-j\omega_1 n} \quad (13)$$

where n is the discrete sequence of time, i.e. m and n are the discrete sequence of space and time respectively. $E_1$ and $E_2$ are the amplitude of two pulses respectively. $\Delta\omega = 2\pi\Delta f = \omega_1 - \omega_2$ is the heterodyne angular frequency. $\Delta f = f_1 - f_2$ is the heterodyne frequency, and $\omega_1$ and $\omega_2$ are respectively the angular frequency of the first and the second pulses.

Considering the boundary condition, the light field can be expressed as:

$$E(m,n) = \begin{cases} E_2 r_m^n e^{j\theta_m^n} \cdot e^{-j\omega_2 n} + & m=1, \ldots, M-1 \\ E_1 r_{m+1}^n e^{j\theta_{m+1}^n} \cdot e^{-j\omega_1 n}, & \\ E_2 r_m^n e^{j\theta_m^n} \cdot e^{-j\omega_2 n}, & m=M \end{cases} \quad (14)$$

iv. The interference intensity of Rayleigh backscattering light of the pulse pair is:

$$I(m,n) = E(m,n) \cdot E(m,n)^* \quad (15)$$

$$= \begin{cases} E_2^2 (r_m^n)^2 + E_1^2 (r_{m+1}^n)^2 + & m=1, \ldots M-1 \\ 2E_1 E_2 r_m^n r_{m+1}^n \cos[\Delta\omega n + (\theta_m^n - \theta_{m+1}^n)], & \\ E_2^2 (r_M^n)^2, & m=M \end{cases}$$

In Eq. (15), the Rayleigh scattering coefficient r and the phase retardance θ are modulated on different terms of the interference intensity of Rayleigh backscattering light by interference modulation, and the terms related to the Rayleigh scattering phase retardance θ in the interference intensity of Rayleigh backscattering light is zero.

v. The DC term of interference intensity is obtained when a low-pass filter is added to the interference intensity of Rayleigh backscattering light of Eq. (15):

$$I(m,n) = \begin{cases} E_2^2 (r_m^n)^2 + E_1^2 (r_{m+1}^n)^2, & m=1, \ldots, M-1 \\ E_2^2 (r_M^n)^2, & m=M \end{cases} \quad (16)$$

In Eq. (16), the DC term of the interference intensity is only related to the Rayleigh scattering coefficient r. Thus, the Rayleigh scattering coefficient r and the phase retardance θ are decoupled by filtering to obtain the separate measurement of the two.

vi. The low-pass filter is used for each slice, and the DC term of interference intensity of each slice is obtained one by one, thus a matrix of the square value of Rayleigh scattering coefficient r versus DC light intensity is obtained:

$$\begin{bmatrix} I_{DC}(1,n) \\ I_{DC}(2,n) \\ M \\ I_{DC}(M-1,n) \\ I_{DC}(M,n) \end{bmatrix} = \qquad (17)$$

$$E_2^2 \begin{bmatrix} (r_1^n)^2 \\ (r_2^n)^2 \\ M \\ (r_{M-1}^n)^2 \\ (r_M^n)^2 \end{bmatrix} + E_1^2 \begin{bmatrix} (r_2^n)^2 \\ (r_3^n)^2 \\ M \\ (r_M^n)^2 \\ 0 \end{bmatrix} = \begin{bmatrix} E_2^2 & E_1^2 & L & 0 & 0 \\ 0 & E_2^2 & E_1^2 & O & 0 \\ M & O & O & O & M \\ 0 & 0 & O & E_2^2 & E_1^2 \\ 0 & 0 & O & 0 & E_2^2 \end{bmatrix} \begin{bmatrix} (r_1^n)^2 \\ (r_2^n)^2 \\ M \\ (r_{M-1}^n)^2 \\ (r_M^n)^2 \end{bmatrix}$$

Further written as:

$$I_{DC} = ER \qquad (18)$$

where $I_{DC}=[I_{DC}(1,n)\ I_{DC}(2,n)\ L\ I_{DC}(M-1,n)\ I_{DC}(M,n)]^T$ is the DC light intensity at different positions. $R=[(r_1'')^2\ (r_2'')^2\ L\ (r_{M-1}'')^2\ (r_M'')^2]^T$ is the square value of Rayleigh scattering coefficient r at different positions. E is the amplitude contained transmission matrix of the pulse pair.

vii. The square value of Rayleigh scattering coefficient is obtained through the matrix of Eq. (18):

$$R=E^{-1}I_{DC} \qquad (19)$$

The Rayleigh scattering coefficient r at different positions of the optical fiber under test is obtained by solving the matrix.

viii. Based on the obtained Rayleigh scattering coefficient r, mixing the interference intensity of Rayleigh backscattering light of Eq. (15) with $I_{r1}=\sin(\Delta\omega n)$, and then pass a low-pass filter, the following result is obtained:

$$I_{sr1}(m,n) = -E_1 E_2 r_m'' r_{m+1}'' \sin(\theta_m'' - \theta_{m+1}'') \qquad (20)$$

Then mixing the interference intensity of Rayleigh backscattering light of Eq. (15) with $I_{r2}=\cos(\Delta\omega n)$, and then pass a low-pass filter, the following result is obtained:

$$I_{sr2}(m,n) = E_1 E_2 r_m'' r_{m+1}'' \cos(\theta_m'' - \theta_{m+1}'') \qquad (21)$$

By dividing Eq. (20) and Eq. (21) and the arctangent is obtained:

$$\theta(m+1,n) - \theta(m,n) = \arctan\left[\frac{I_{sr1}(m,n)}{I_{sr2}(m,n)}\right] \qquad (22)$$

The Rayleigh scattering phase retardance θ at different positions of the optical fiber under test is obtained by recursion calculation of Eq. (22).

Single pulse scattering and interfere with local light. The light scattering parameter measurement method of the invention comprises the following steps:

1) The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber. The other channel is frequency shifted by the second acousto-optic modulator as the local light.

2) The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w.

3) The Rayleigh backscattering light generated by the optical fiber under test reaches the second coupler through the third port of the circulator, and the output of the second acousto-optic modulator also reaches the second coupler. The two beams interfere with each other, which is detected by the detector. The interference light intensity is collected by the data acquisition unit and transmitted to the computer.

4) The interference light intensity is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in}a_i\exp[j(\phi_{in}+\phi_{i0})]$, where $E_{in}$ is the amplitude of the incident light, $\phi_{in}$ is the phase of the incident light, $a_i$ is the scattering coefficient of the i-th scattering particle, and $\phi_{i0}$ is the scattering phase. According to the theory of electric dipole, the scattered light caused by each scattering particle is in phase with the incident light, i.e $\phi_{i0}=0$.

ii. Slice model with particle collection is used: The sampling rate of the data acquisition unit is $f_a$, and the forward transmission distance of the pulse is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i=2\beta z_i$ will be introduced, where β is the wave number and $z_i$ is the position of the i-th scattering particle. If the total length of the optical fiber under test is L and the length of each slice is δl, the optical fiber under test is divided into M=L/δl slices, and the Rayleigh scattering parameters of the m-th slice are $r_m$ and $\theta_m$, where m=1, 2, . . . , M. The scattering parameter of the m-th slice is the superposition of scattering particles inside it:

$$r_m e^{j\theta_m} = \sum_{i=1}^{K} a_i e^{j\phi_i} \qquad (1)$$

where $r_m$ and $\theta_m$ are the Rayleigh scattering coefficient and phase retardance of the m-th slice, and K is the total number of scattering particles in the m-th slice.

iii. The number of slices covered by a single pulse width is $M_w=w/\delta l$. At the time moment $t_0$, the pulse completely enters the optical fiber under test, and at the time moment $t_1$, the pulse transmits forward a slice. At the time moment $t_M$, the pulse completely leaves the optical fiber under test. The superposition field of Rayleigh backscattering light caused by the pulse and the local light is expressed as:

$$E(m, n) = E_1 \sum_{k=m}^{m+M_w/2-1} r_k^n e^{j(\theta_k^n + \Phi_k^n)} \cdot e^{-j\omega_1 n} + E_2 e^{-j\omega_2 n + j\varphi_0} \quad (23)$$

where n is the discrete sequence of time, i.e. m and n are the discrete sequence of space and time respectively. $E_1$ is the amplitude of the pulse light and $E_2$ is the amplitude of the local light. $\Phi_k^n$ is the phase change induced by external vibration and $\varphi_0$ is the initial phase of the local light. $\Delta\omega = 2\pi\Delta f = \omega_1 - \omega_2$ is the heterodyne angular frequency. $\Delta f = f_1 - f_2$ is the heterodyne frequency, and $\omega_1$ and $\omega_2$ are respectively the angular frequency of the pulse and the local light.

iv. The interference light intensity is:

(24)

$$I(m, n) = E(m, n) \cdot E(m, n)^*$$

$$= E_1^2 \sum_{k=m}^{m+M_w/2-1} (r_k^n)^2 + E_2^2 \quad (24a)$$

$$+ 2E_1^2 \sum_{k,l=m, l>k}^{m+M_w/2-1} r_k^n r_l^n \cos(\Phi_k^n - \Phi_l^n + \theta_k^n - \theta_l^n) \quad (24b)$$

$$+ E_1 E_2 \sum_{k=m}^{m+M_w/2-1} r_k^n \cos[\Delta\omega n + \varphi_0 - (\theta_k^n + \Phi_k^n)] \quad (24c)$$

v. The optical fiber stretching device applies a linear stretch to the optical fiber under test, so as to add uniform phase change signals at all positions of the optical fiber under test. The phase change of the m-th slice is expressed as:

$$\varphi(m,n) = \gamma n \quad (25)$$

where $\gamma$ is the phase change rate, which is determined by the stretching rate of the optical fiber stretching device. The accumulated phase change is expressed as:

$$\Phi_k^n - \Phi_l^n = \sum_{m=1}^{k} 2\varphi(m, n) - \sum_{m=1}^{l} 2\varphi(m, n) = 2(k-l)\gamma n \quad (26)$$

Thus the interference light intensity is expressed as:

(27)

$$I(m, n) = E_1^2 \sum_{k=m}^{m+M_w/2-1} (r_k^n)^2 + E_2^2 \quad (27a)$$

$$+ 2E_1^2 \sum_{k,l=m, l>k}^{m+M_w/2-1} r_k^n r_l^n \cos(2(k-l)\gamma n + \theta_k^n - \theta_l^n) \quad (27b)$$

$$+ 2E_1 E_2 \sum_{k=m}^{m+M_w/2-1} r_k^n \cos[\Delta\omega n + \varphi_0 - (\theta_k^n + 2k\gamma n)] \quad (27c)$$

In Eq. (27), The Rayleigh scattering coefficient r and the phase retardance θ are modulated on different terms of the interference light intensity by interference modulation. All the summation terms in Eq. (27b) are cosine functions. By controlling the optical fiber stretching device, $2(k-l)\gamma n$ traverses $[0, 2\pi]$, so that the average value of these cosine functions is zero. All the summation terms in Eq. (27c) are cosine functions as well with the average value zero. As a result, the average value of the terms related to the Rayleigh scattering phase retardance θ of the interference light intensity is zero.

vi. The DC term of the intensity is obtained when a low-pass filter is added to the interference light intensity of Eq. (27):

$$I_{DC}(m, n) = E_1^2 \sum_{k=m}^{m+M_w/2-1} (r_k^n)^2 + E_2^2 \quad (28)$$

In Eq. (28), the DC term of the intensity is only related to the Rayleigh scattering coefficient r. Thus, the Rayleigh scattering coefficient r and the phase retardance θ are decoupled by filtering to obtain the separate measurement of the two.

vii. The low-pass filter is used for each slice, and the DC term of the intensity of each slice is obtained one by one, thus a matrix of the square value of Rayleigh scattering coefficient r versus DC light intensity is obtained:

$$\begin{bmatrix} I_{DC}(1, n) \\ I_{DC}(2, n) \\ M \\ I_{DC}(M-1, n) \\ I_{DC}(M, n) \end{bmatrix} = E_1^2 \begin{bmatrix} 1 & 1 & L & 0 & 0 \\ 0 & 1 & L & 0 & 0 \\ M & M & O & M & M \\ 0 & 0 & L & 1 & 1 \\ 0 & 0 & L & 0 & 1 \end{bmatrix} \begin{bmatrix} (r_1^n)^2 \\ (r_2^n)^2 \\ M \\ (r_{M-1}^n)^2 \\ (r_M^n)^2 \end{bmatrix} + E_2^2 \quad (29)$$

Further written as:

$$I_{DC} = E_1^2 CR + E_2^2 \quad (30)$$

where $I_{DC} = [I_{DC}(1,n)\ I_{DC}(2,n)\ L\ I_{DC}(M-1,n)\ I_{DC}(M,n)]^T$ is the DC light intensity at different positions. $R = [(r_1^n)^2\ (r_2^n)^2\ L\ (r_{M-1}^n)^2\ (r_M^n)^2]^T$ is the square value of Rayleigh scattering coefficient r at different positions. C is the transmission matrix of the pulse.

viii. The square value of Rayleigh scattering coefficient is obtained through the matrix of Eq. (30):

$$R = \frac{C^{-1}(I_{DC} - E_2^2)}{E_1^2} \quad (31)$$

The Rayleigh scattering coefficient r at different positions of the optical fiber under test is obtained by solving the matrix.

ix. Based on the obtained Rayleigh scattering coefficient r, the optical fiber under test is then placed in the sound insulation and vibration isolation device, so the phase change caused by external vibration is $\Phi_k^n = 0$.

x. Mixing the interference light intensity of Eq. (24) with $I_{r1} = \sin(\Delta\omega n)$, and then pass a low-pass filter, the following result is obtained:

$$I_{sr1}(m, n) = -E_1 E_2 \sum_{k=m}^{m+M_w/2-1} r_k^n \sin(\varphi_0 - \theta_k^n) \quad (32)$$

Then mixing the interference light intensity of Eq. (24) with $I_2=\cos(\Delta\omega n)$, and then pass a low-pass filter, the following result is obtained:

$$I_{sr2}(m,n) = E_1 E_2 \sum_{k=m}^{m+M_w/2-1} r_k^n \cos(\varphi_0 - \theta_k^n) \quad (33)$$

Combining the obtained Rayleigh scattering coefficient r into Eq. (32) and Eq. (33), the Rayleigh scattering phase retardance θ at different positions of the optical fiber under test is obtained by matrix operation.

Single pulse scattering and interfere with local light while the pulse width is twice the length of the slice. The light scattering parameter measurement method of the invention comprises the following steps:

1) The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is placed in the sound insulation and vibration isolation device. The other channel is frequency shifted by the second acousto-optic modulator as the local light.

2) The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w.

3) The Rayleigh backscattering light generated by the optical fiber under test reaches the second coupler through the third port of the circulator, and the output of the second acousto-optic modulator also reaches the second coupler. The two beams interfere with each other, which is detected by the detector. The interference light intensity is collected by the data acquisition unit and transmitted to the computer.

4) The interference light intensity is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in}a_i\exp[j(\phi_{in}+\phi_{i0})]$, where $E_{in}$ is the amplitude of the incident light, $\phi_{in}$ is the phase of the incident light, $a_i$ is the scattering coefficient of the i-th scattering particle, and $\phi_{i0}$ is the scattering phase. According to the theory of electric dipole, the scattered light caused by each scattering particle is in phase with the incident light, i.e. $\theta_{i0}=0$.

ii. Slice model with particle collection is used: The sampling rate of the data acquisition unit is $f_a$, and the forward transmission distance of the pulse is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i=2\beta z_i$ will be introduced, where β is the wave number and $z_i$ is the position of the i-th scattering particle. If the total length of the optical fiber under test is L and the length of each slice is δl, the optical fiber under test is divided into M=L/δl slices. The number of slices covered by a single pulse width is $M_w=w/\delta l$, and the relationship between the pulse width w and the sampling rate $f_a$ of the data acquisition unit is $wf_a=2c/n_r$, that is the pulse width is twice the length of the slice, i.e. $M_w=2$. The Rayleigh scattering parameters of the m-th slice are $r_m$ and $\theta_m$, where m=1, 2, . . . , M. The scattering parameter of the m-th slice is the superposition of scattering particles inside it:

$$r_m e^{j\theta_m} = \sum_{i=1}^{K} a_i e^{j\phi_i} \quad (1)$$

where $r_m$ and $\theta_m$ are the Rayleigh scattering coefficient and phase retardance of the m-th slice, and K is the total number of scattering particles in the m-th slice.

iii. The optical fiber under test is placed in the sound insulation and vibration isolation device, so the phase change caused by external vibration is $\Phi_k^n=0$. In addition, $wf_a=2c/n_r$, i.e. the number of slices covered by a single pulse width is $M_w=2$. The superposition field of Rayleigh backscattering light caused by the pulse and the local light is expressed as:

$$E(m,n)=E_1 r_k^n e^{j\theta_k^n} e^{-j\omega_1 n}+E_2 e^{-j\omega_2 n+j\varphi_0} \quad (34)$$

where n is the discrete sequence of time, i.e. m and n are the discrete sequence of space and time respectively. $E_1$ is the amplitude of the pulse light and $E_2$ is the amplitude of the local light. $\varphi_0$ is the initial phase of the local light. $\Delta\omega=2\pi\Delta f=\omega_1-\omega_2$ is the heterodyne angular frequency. $\Delta f=f_1-f_2$ is the heterodyne frequency, and $\omega_1$ and $\omega_2$ are respectively the angular frequency of the pulse and the local light.

iv. The interference light intensity is:

$$I(m,n)=E_1^2(r_m^n)^2+E_2^2+2E_1 E_2 r_m^n \cos[\Delta\omega n+\varphi_0-\theta_m^n] \quad (35)$$

v. The DC term of the intensity is obtained when a low-pass filter is added to the interference light intensity of Eq. (35):

$$I(m,n)=E_1^2(r_m^n)^2+E_2^2 \quad (36)$$

In Eq. (36), the DC term of the intensity is only related to the Rayleigh scattering coefficient r. Thus, the Rayleigh scattering coefficient r and the phase retardance θ are decoupled by filtering to obtain the separate measurement of the two.

vi. The low-pass filter is used for each slice, and the DC term of the intensity of each slice is obtained one by one, thus a matrix of the square value of Rayleigh scattering coefficient r versus DC light intensity is obtained:

$$\begin{bmatrix} I_{DC}(1,n) \\ I_{DC}(2,n) \\ M \\ I_{DC}(M-1,n) \\ I_{DC}(M,n) \end{bmatrix} = E_1^2 \begin{bmatrix} (r_1^n)^2 \\ (r_2^n)^2 \\ M \\ (r_{M-1}^n)^2 \\ (r_M^n)^2 \end{bmatrix} + E_2^2 \quad (37)$$

Further written as:

$$I_{DC}=E_1^2 R+E_2^2 \quad (38)$$

where $I_{DC}=[I_{DC}(1,n)\ I_{DC}(2,n)\ L\ I_{DC}(M-1,n)\ I_{DC}(M,n)]^T$ is the DC light intensity at different positions. $R=[(r_1'')^2\ (r_2'')^2\ L\ (r_{M-1}'')^2\ (r_M'')^2]^T$ is the square value of Rayleigh scattering coefficient r at different positions.

vii. The square value of Rayleigh scattering coefficient is obtained through the matrix of Eq. (38):

$$R = \frac{I_{DC} - E_2^2}{E_1^2} \quad (39)$$

The Rayleigh scattering coefficient r at different positions of the optical fiber under test is obtained by solving the matrix.

viii. Based on the obtained Rayleigh scattering coefficient r, mixing the interference light intensity of Eq. (35) with $I_{r1}=\sin(\Delta\omega n)$, and then pass a low-pass filter, the following result is obtained:

$$I_{sr}(m,n)=-E_1 E_2 r_m'' \sin(\varphi_0 - \theta_m'') \quad (40)$$

Then mixing the interference light intensity of Eq. (35) with $I_{r2}=\cos(\Delta\omega n)$, and then pass a low-pass filter, the following result is obtained:

$$I_{sr2}(m,n)=E_1 E_2 r_m'' \cos(\varphi_0 - \theta_m'') \quad (41)$$

By dividing Eq. (40) and Eq. (41) and the arctangent is obtained:

$$\theta(m, n) = \arctan\left[\frac{I_{sr1}(m, n)}{I_{sr2}(m, n)}\right] + \varphi_0 \quad (42)$$

The Rayleigh scattering phase retardance $\theta$ at different positions of the optical fiber under test is obtained by recursion calculation of Eq. (42).

Furthermore, based on the measured Rayleigh scattering coefficient r and phase retardance $\theta$, the distributed temperature and strain sensing is obtained by using these parameters. Specifically, the corresponding relations of Rayleigh scattering coefficient r and phase retardance $\theta$ with temperature and strain are calibrated respectively in the thermostat and strain stretching device, and the following expressions are obtained:

$$\Delta r(z)=C_{11}\Delta T(z)+C_{12}\Delta\varepsilon(z) \quad (43)$$

$$\Delta\theta(z)=C_{21}\Delta T(z)+C_{22}\Delta\varepsilon(z) \quad (44)$$

where $\Delta r(z)$ and $\Delta\theta(z)$ are the variations of Rayleigh scattering coefficient and phase retardance at position z of the optical fiber under test respectively. $\Delta T(z)$ and $\Delta\varepsilon(z)$ are the variations of temperature and strain at position z of the optical fiber under test respectively. $C_{11}$, $C_{12}$, $C_{21}$ and $C_{22}$ are the coefficients of variation. Eq. (43) and Eq. (44) can be written in matrix form:

$$\begin{bmatrix}\Delta r(z)\\ \Delta\theta(z)\end{bmatrix} = \begin{bmatrix}C_{11} & C_{12}\\ C_{21} & C_{22}\end{bmatrix}\begin{bmatrix}\Delta T(z)\\ \Delta\varepsilon(z)\end{bmatrix} \quad (45)$$

The transfer coefficient matrix of Rayleigh scattering coefficient and phase retardance with temperature and strain is calculated as:

$$C_{T\varepsilon} = \begin{bmatrix}C_{11} & C_{12}\\ C_{21} & C_{22}\end{bmatrix} \quad (46)$$

The variation of Rayleigh scattering coefficient $\Delta r'(z)$ and phase retardance $\Delta\theta'(z)$ are obtained in one measurement. By using the transfer coefficient matrix, the variation of temperature and strain can be calculated as:

$$\begin{bmatrix}\Delta T'(z)\\ \Delta\varepsilon'(z)\end{bmatrix} = C_{T\varepsilon}^{-1}\begin{bmatrix}\Delta r'(z)\\ \Delta\theta'(z)\end{bmatrix} \quad (47)$$

This invention adopts dual-frequency scattering interference technology to obtain distributed measurement of Rayleigh scattering parameters in optical fiber. The key of this invention is: (1) The Rayleigh scattering coefficient and phase retardance are modulated on different components of the interference signal respectively by using the dual-frequency interference technology. The two can be decoupled by simple filtering, so as to obtain the separate measurement of the two. (2) The optical fiber stretching device is used to apply a linear stretch to the optical fiber under test, so as to add uniform phase change signals at all positions of the optical fiber under test. As a result, the average value of the terms related to the Rayleigh scattering phase retardance $\theta$ in the interference intensity of Rayleigh backscattering light is zero, and the term containing only Rayleigh scattering coefficient r can be extracted by low-pass filtering. (3) The reasonable selection of pulse width and sampling rate of data acquisition unit makes the pulse width twice the length of the slice, thus simplifying the calculation equation. (4) The distributed calculation of Rayleigh scattering coefficient r and phase retardance $\theta$ is obtained by using transfer matrix and matrix operation. (5) Using the measured Rayleigh scattering coefficient r and phase retardance $\theta$, a new distributed temperature and strain sensor can be obtained.

The presently disclosed system and methods can have one or more of the following advantages:

The direct measurement of Rayleigh scattering parameters is of great significance to foundation and application research fields related to Rayleigh scattering of optical fiber. First of all, it can provide a new quantitative measurement tool for the research of the random characteristics of Rayleigh scattering of optical fiber, and then provide an auxiliary means for calibrating the non-uniformity characteristics of optical fiber itself. Secondly, it can provide experimental means for studying the deep correlation between random Rayleigh scattering and signal fading in distributed acoustic sensor system, and provide theoretical support for suppressing the signal fading. From the perspective of sensing, the conventional systems are based on scattering interference signals or incoherent intensity signals to obtain external information, which are functions of the two parameters of Rayleigh scattering. The direct measurement of Rayleigh scattering parameters can open up a new way for distributed sensing. Finally, the direct measurement of Rayleigh scattering parameters is of great significance to the application and basic research of fiber random laser.

DETAILED DESCRIPTION OF THE INVENTION

The invention is further described through specific embodiments in combination with the figures.

Embodiment 1

Figure 1:
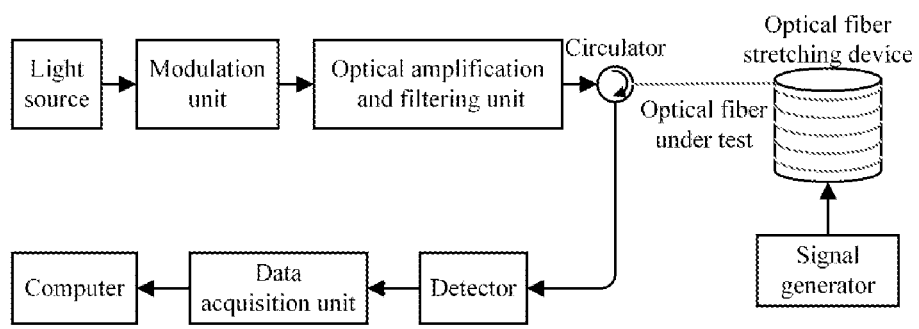
FIG. 1 is a structural diagram of embodiment 1 of the light scattering parameter measurement system in accordance with some embodiments of the present invention.

As shown in FIG. 1, a light scattering parameter measurement system that adopts dual-pulse scattering interference includes a light source, a modulation unit, an optical amplification and filtering unit, a circulator, an optical fiber stretching device, a sound insulation and vibration isolation device, a signal generator, a detector, a data acquisition unit, and a computer. The light source emits continuous light with frequency $f_0$, which is modulated into two pulses through the modulation unit. The frequencies of the former and latter pulses are $f_1$ and $f_2$ respectively, which is called a pulse pair. The pulse pair is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber. The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer. The interference intensity of Rayleigh backscattering light is processed by computer using distributed measurement.

Figure 2:
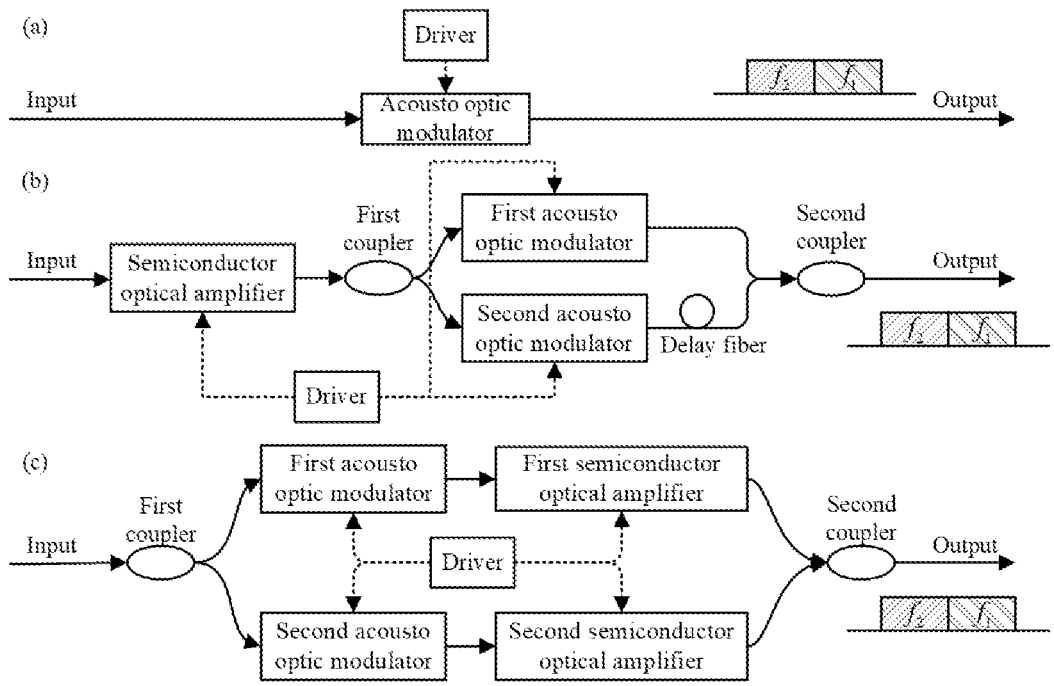
FIG. 2 is a structural diagram of the modulation unit of the light scattering parameter measurement system of the invention in accordance with an embodiment of the present invention, where (a) is a structural diagram of the modulation unit using a single acousto-optic modulator, (b) is a structural diagram of the modulation unit using two acousto-optic modulators and a single semiconductor optical amplifier, and (c) is a structure diagram of the modulation unit using two acousto-optic modulators and two semiconductor optical amplifiers.

As shown in FIG. 2, the modulation unit can have three implementations: a single acousto-optic modulator is used, two acousto-optic modulators and a single semiconductor optical amplifier are used, and two acousto-optic modulators and two semiconductor optical amplifiers are used. As shown in FIG. 2(*a*), when a single acousto-optic modulator is used, the modulation unit includes a driver and an acousto-optic modulator. The driver is connected with the acousto-optic modulator. The input is directly connected to the input port of the acousto-optic modulator. Two pulse signals with frequency shift and time delay are generated by the driver to drive the acousto-optic modulator. The driver generates an electric driving signal, and the output of the acousto-optic modulator is a pulse pair with frequency $f_1$ and $f_2$, and the width of the pulse is w. As shown in FIG. 2(*b*), when two acousto-optic modulators and a single semiconductor optical amplifier are used, the modulation unit includes semiconductor optical amplifier, first and second couplers, first and second acousto-optic modulators, delay fiber and driver. The semiconductor optical amplifier is connected to the first and the second acousto-optic modulators by the first couple. The output end of the second acousto-optic modulator, which is connected with a delay fiber, and the output end of the first acousto-optic modulator are connected to the second coupler. The driver is connected to the semiconductor optical amplifier, the first and the second acousto-optic modulators. The input is firstly modulated into pulse signals by the semiconductor optical amplifier, and then divided into two channels through the first coupler, one through the first acousto-optic modulator, the other through the second acousto-optic modulator and a length of delay fiber. The length of the delay fiber is w. The two channels are combined into one output through the second coupler, and the output is a pulse pair. The driver controls the semiconductor optical amplifier to generate pulse signal, and controls the first and the second acousto-optic modulators to shift the frequency of the light wave. The frequencies of the lights of the two channels are $f_1$ and $f_2$ respectively. As shown in FIG. 2(*c*), when two acousto-optic modulators and two semiconductor optical amplifiers are used, the modulation unit includes first and second semiconductor optical amplifiers, first and second couplers, first and second acousto-optic modulators and driver. The output ports of the first coupler are respectively connected to the first and the second acousto-optic modulators, and the first and the second acousto-optic modulators are respectively connected to the first and the second semiconductor optical amplifiers. The output ports of the first and the second semiconductor optical amplifiers are connected to the second coupler, and the driver is respectively connected to the first and the second acousto-optic modulators and the first and the second semiconductor optical amplifiers. The input is divided into two channels through the first coupler. Channel one generates frequency shift by the first acousto-optic modulator and modulates the light into pulse by the first semiconductor optical amplifier. Channel two generates frequency shift by the second acousto-optic modulator and modulates the light into pulse by the second semiconductor optical amplifier. The time of pulse generation is controlled by the driver so that the two pulses have a delay time. The pulse sent by the driver to the second semiconductor optical amplifier is delayed by w than the pulse sent to the first semiconductor optical amplifier. After that, the two channels are combined into one output through the second coupler, and the output is a pulse pair. The frequencies of the lights of the two channels are $f_1$ and $f_2$ respectively.

The embodiment adopts dual-pulse scattering interference. The light scattering parameter measurement method comprises the following steps:

1) The light source emits continuous light with frequency $f_0$, which is modulated into two pulses through the modulation unit. The frequencies of the former and latter pulses are $f_1$ and $f_2$ respectively, which is called a pulse pair.

2) The pulse pair is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber.

3) The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer.

Figure 3:
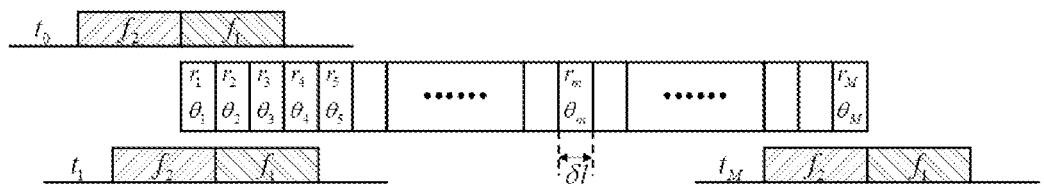
FIG. 3 illustrates a scattering model of a pulse pair in the optical fiber under test of the light scattering parameter measurement system in accordance with some embodiments of the present invention.

4) The interference intensity of Rayleigh backscattering light is processed by computer using distributed measurement:

i. The inhomogeneity of optical fiber can cause random Rayleigh scattering, which is an elastic scattering. The diameter of scattering particles is far less than the wavelength of incident light. The optical fiber under test is composed of randomly distributed scattering particles, whose diameter is far less than the wavelength of incident light. When the light wave is scattered by the i-th scattering particle, the scattered light field is expressed as $E_{in}a_i\exp[j(\phi_{in}+\phi_{i0})]$, where $E_{in}$ is the amplitude of the incident light, $\phi_{in}$ is the phase of the incident light, $a_i$ is the scattering coefficient of the i-th scattering particle, and $\phi_{in}$ is the scattering phase. Since the size of scattering particles is far smaller than the wavelength of incident light (usually 1550 nm), it cannot be directly measured. The invention adopts the slice model of particle collection for processing. According to the theory of electric dipole, the scattered light caused by each scattering particle is in phase with the incident light, i.e $\phi_{i0}=0$.

ii. A slice model with particle collection is used: The sampling rate of the data acquisition unit is $f_a$, and the forward transmission distance of the pulse pair is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. As shown in FIG. 3, due to the random position of scattering particles, when a large amount of scattered light in the slice is emitted backward, different phase $\phi_i = 2\beta z_i$ will be introduced, where $\beta$ is the wave number and $z_i$ is the position of the i-th scattering particle. If the total length of the optical fiber under test is L and the length of each slice is $\delta l$, the optical fiber under test is divided into $M = L/\delta l$ slices, and the Rayleigh scattering parameters of the m-th slice are $r_m$ and $\theta_m$, where m=1, 2, . . . , M. The scattering parameter of the m-th slice is the superposition of scattering particles inside it:

$$r_m e^{j\theta_m} = \sum_{i=1}^{K} a_i e^{j\phi_i} \quad (1)$$

where $r_m$ and $\theta_m$ are the Rayleigh scattering coefficient and phase retardance of the m-th slice, and K is the total number of scattering particles in the m-th slice.

iii. The number of slices covered by a single pulse width is $M_w = w/\delta l$. At the time moment $t_0$, the first pulse of the pulse pair completely enters the optical fiber under test, and at the time moment $t_1$, the pulse pair transmits forward a slice. At the time moment $t_M$, the first pulse completely leaves the optical fiber under test. The Rayleigh backscattering light field of the pulse pair is expressed as:

$$E(m, n) = \\ E_2 \sum_{k=m}^{m+M_w/2-1} r_k^n e^{j(\theta_k^n+\Phi_k^n)} \cdot e^{-j\omega_2 n} + E_1 \sum_{k=m+M_w/2}^{m+M_w-1} r_k^n e^{j(\theta_k^n+\Phi_k^n)} \cdot e^{-j\omega_1 n} \quad (2)$$

where n is the discrete sequence of time, i.e. m and n are the discrete sequence of space and time respectively. $E_1$ and $E_2$ are the amplitude of two pulses respectively. $\Phi_k^n$ is the phase change induced by external vibration. $\Delta\omega = 2\pi\Delta f = \omega_1 - \omega_2$ is the heterodyne angular frequency. $\Delta f = f_1 - f_2$ is the heterodyne frequency, and $\omega_1$ and $\omega_2$ are respectively the angular frequency of the first and the second pulses.

iv. The interference intensity of Rayleigh backscattering light of the pulse pair is:

(3)

$$I(m, n) = E(m, n)E(m, n)^*$$

$$= E_2^2 \sum_{k=m}^{m+M_w/2-1} (r_k^n)^2 + E_1^2 \sum_{k=m+M_w/2}^{m+M_w-1} (r_k^n)^2 \quad (3a)$$

$$+ 2E_2^2 \sum_{k,l=m, l>k}^{m+M_w/2-1} r_k^n r_l^n \cos(\Phi_k^n - \Phi_l^n + \theta_k^n - \theta_l^n)$$

$$+ 2E_1^2 \sum_{k,l=m+M_w/2, l>k}^{m+M_w-1} r_k^n r_l^n \cos(\Phi_k^n - \Phi_l^n + \theta_k^n - \theta_l^n) \quad (3b)$$

$$+ 2E_1 E_2 \sum_{i=m}^{m+M_w/2-1} \sum_{j=m+M_w/2}^{m+M_w-1} r_k^n r_l^n \cos[\Delta\omega n + (\Phi_k^n - \Phi_l^n + \theta_k^n - \theta_l^n)] \quad (3c)$$

v. The optical fiber stretching device applies a linear stretch to the optical fiber under test, so as to add uniform phase change signals at all positions of the optical fiber under test. The phase change of the m-th slice is expressed as:

$$\varphi(m,n) = \gamma n \quad (4)$$

where $\gamma$ is the phase change rate, which is determined by the stretching rate of the optical fiber stretching device. The accumulated phase change is expressed as:

$$\Phi_k^n - \Phi_l^n = \sum_{m=1}^{k} 2\varphi(m, n) - \sum_{m=1}^{l} 2\varphi(m, n) = 2(k-l)\gamma n \quad (5)$$

Thus the interference intensity of Rayleigh backscattering light is expressed as:

$$I(m, n) = E_2^2 \sum_{k=m}^{m+M_w/2-1} (r_k^n)^2 + E_1^2 \sum_{k=m+M_w/2}^{m+M_1-1} (r_k^n)^2 \quad (6a)$$

$$+2E_2^2 \sum_{k,l=m,l>k}^{m+M_w/2-1} r_k^n r_l^n \cos[2(k-l)\gamma n + \theta_k^n - \theta_l^n] \quad$$

$$+2E_1^2 \sum_{k,l=m+M_w/2,l>k}^{m+M_w-1} r_k^n r_l^n \cos[2(k-l)\gamma n + \theta_k^n - \theta_l^n] \quad (6b)$$

$$+2E_1 E_2 \sum_{i=m}^{m+M_w/2-1} \sum_{j=m+M_w/2}^{m+M_w-1} r_k^n r_l^n \cos[\Delta\omega n + 2(k-l)\gamma n + \theta_k^n - \theta_l^n] \quad (6c)$$

In Eq. (6), The Rayleigh scattering coefficient r and the phase retardance θ are modulated on different terms of the interference intensity of Rayleigh backscattering light by interference modulation. All the summation terms in Eq. (6b) are cosine functions. By controlling the optical fiber stretching device, $2(k-l)\gamma n$ traverses $[0, 2\pi]$, so that the average value of these cosine functions is zero. All the summation terms in Eq. (6c) are cosine functions as well with the average value zero. As a result, the average value of the terms related to the Rayleigh scattering phase retardance θ of the interference intensity of Rayleigh backscattering light is zero.

vi. The DC term of interference intensity is obtained when a low-pass filter is added to the interference intensity of Rayleigh backscattering light of Eq. (6):

$$I_{DC}(m, n) = E_2^2 \sum_{k=m}^{m+M_w/2-1} (r_k^n)^2 + E_1^2 \sum_{k=m+M_w/2}^{m+M_w-1} (r_k^n)^2 \quad (7)$$

In Eq. (7), the DC term of the interference intensity is only related to the Rayleigh scattering coefficient r. Thus, the Rayleigh scattering coefficient r and the phase retardance θ are decoupled by filtering to obtain the separate measurement of the two.

vii. The low-pass filter is used for each slice, and the DC term of interference intensity of each slice is obtained one by one, thus a matrix of the square value of Rayleigh scattering coefficient r versus DC light intensity is obtained:

$$\begin{bmatrix} I_{DC}(1,n) \\ I_{DC}(2,n) \\ M \\ I_{DC}(M-1,n) \\ I_{DC}(M,n) \end{bmatrix} = E_2^2 \begin{bmatrix} 1 & 1 & L & 0 & 0 \\ 0 & 1 & L & 0 & 0 \\ M & M & O & M & M \\ 0 & 0 & L & 1 & 1 \\ 0 & 0 & L & 0 & 1 \end{bmatrix} \begin{bmatrix} (r_1^n)^2 \\ (r_2^n)^2 \\ M \\ (r_{M-1}^n)^2 \\ (r_M^n)^2 \end{bmatrix} + E_1^2 \begin{bmatrix} 0 & 1 & L & 0 & 0 \\ 0 & 0 & L & 0 & 0 \\ M & M & O & M & M \\ 0 & 0 & L & 0 & 1 \\ 0 & 0 & L & 0 & 0 \end{bmatrix} \begin{bmatrix} (r_1^n)^2 \\ (r_2^n)^2 \\ M \\ (r_{M-1}^n)^2 \\ (r_M^n)^2 \end{bmatrix} \quad (8)$$

Further written as:

$$I_{DC} = E_2^2 C_2 R + E_1^2 C_1 R = (E_2^2 C_2 + E_1^2 C_1) R = CR \quad (9)$$

where $I_{DC}=[I_{DC}(1,n)\ I_{DC}(2,n)\ L\ I_{DC}(M-1,n)\ I_{DC}(M,n)]^T$ is the DC light intensity at different positions. $R=[(r_1^n)^2\ (r_2^n)^2\ L\ (r_{M-1}^n)^2\ (r_M^n)^2]^T$ is the square value of Rayleigh scattering coefficient r at different positions. $C_1$ and $C_2$ are the transmission matrix of the pulse pair.

viii. The square value of Rayleigh scattering coefficient is obtained through the matrix of Eq. (9):

$$R = C^{-1} I_{DC} \quad (10)$$

The Rayleigh scattering coefficient r at different positions of the optical fiber under test is obtained by solving the matrix.

ix. Based on the obtained Rayleigh scattering coefficient r, the optical fiber under test is then placed in the sound insulation and vibration isolation device, so the phase change caused by external vibration is $\Phi_k^n = 0$.

x. Mixing the interference intensity of Rayleigh backscattering light of Eq. (3) with $I_{r1}=\sin(\Delta\omega n)$, and then pass a low-pass filter, the following result is obtained:

$$I_{sr1}(m, n) = -E_1 E_2 \sum_{k=m}^{m+M_w/2-1} \sum_{l=m+M_w/2}^{m-M_w-1} r_k^n r_l^n \sin(\theta_k^n - \theta_l^n) \quad (11)$$

Then mixing the interference intensity of Rayleigh backscattering light of Eq. (3) with $I_{r2}=\cos(\Delta\omega n)$, and then pass a low-pass filter, the following result is obtained:

$$I_{sr2}(m, n) = E_1 E_2 \sum_{k=m}^{m+M_w/2-1} \sum_{l=m+M_w/2}^{m-M_w-1} r_k^n r_l^n \cos(\theta_k^n - \theta_l^n) \quad (12)$$

Combining the obtained Rayleigh scattering coefficient r into Eq. (11) and Eq. (12), the Rayleigh scattering phase retardance θ at different positions of the optical fiber under test is obtained by matrix operation.

Embodiment 2

In this embodiment, the pulse width is twice the length of the slice. The optical fiber under test is placed in a sound insulation and vibration isolation device and an optical fiber stretching device is not required. The other components are the same as the Embodiment 1.

This embodiment adopts dual-pulse scattering interference while the pulse width is twice the length of the slice. The light scattering parameter measurement method of the invention comprises the following steps:

1) The light source emits continuous light with frequency $f_0$, which is modulated into two pulses through the modulation unit. The frequencies of the former and latter pulses are $f_1$ and $f_2$ respectively, which is called a pulse pair.

2) The pulse pair is amplified and filtered by the optical amplification and filtering unit, and then injected into the first port of the circulator, and the second port of the circulator is connected with the optical fiber under test. The optical fiber under test is placed in the sound insulation and vibration isolation device.

3) The Rayleigh backscattering light in the optical fiber under test generated by a pulse pair reaches the detector through the third port of the circulator and the scattering light interferes at the detector. The interference intensity of Rayleigh backscattering light is collected by the data acquisition unit and transmitted to the computer.

4) The interference intensity of Rayleigh backscattering light is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in}a_i\exp[j(\phi_{in}+\phi_{i0})]$, where $E_{in}$ is the amplitude of the incident light, $\phi_{in}$ is the phase of the incident light, $a_{in}$ is the scattering coefficient of the i-th scattering particle, and $\phi_{i0}$ is the scattering phase. According to the theory of electric dipole, the scattered light caused by each scattering particle is in phase with the incident light, i.e $\phi_{i0}=0$.

ii. Slice model with particle collection is used: The sampling rate of the data acquisition unit is $f_a$, and the forward transmission distance of the pulse pair is $\delta l=c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i=2\beta z_i$ will be introduced, where $\beta$ is the wave number and $z_i$ is the position of the i-th scattering particle. If the total length of the optical fiber under test is L and the length of each slice is $\delta l$, the optical fiber under test is divided into $M=L/\delta l$ slices. The number of slices covered by a single pulse width is $M_w=w/\delta l$, and the relationship between the pulse width w and the sampling rate $f_a$ of the data acquisition unit is $wf_a=2c/n_r$, that is the pulse width is twice the length of the slice, i.e. $M_w=2$. The Rayleigh scattering parameters of the m-th slice are $r_m$ and $\theta_m$, where $m=1, 2, \ldots, M$. The scattering parameter of the m-th slice is the superposition of scattering particles inside it:

$$r_m e^{j\theta_m} = \sum_{i=1}^{K} a_i e^{j\phi_i} \quad (1)$$

where $r_m$ and $\theta_m$ are the Rayleigh scattering coefficient and phase retardance of the m-th slice, and K is the total number of scattering particles in the m-th slice.

iii. The optical fiber under test is placed in the sound insulation and vibration isolation device, so the phase change caused by external vibration is on, $\Phi_k{}^n=0$. In addition, $wf_{a\,l}=2c/n_r$, i.e. the number of slices covered by a single pulse width is $M_w=2$. The Rayleigh backscattering light field of the pulse pair is expressed as:

$$E(m,n)=E_2 r_m{}^n e^{j\theta_m{}^n}\cdot e^{-j\omega_2 n}+E_1 r_{m+1}{}^n e^{j\theta_{m+1}{}^n}\cdot e^{-j\omega_1 n} \quad (13)$$

where n is the discrete sequence of time, i.e. m and n are the discrete sequence of space and time respectively. $E_1$ and $E_2$ are the amplitude of two pulses respectively. $\Delta\omega=2\pi\Delta f=\omega_1-\omega_2$ is the heterodyne angular frequency. $\Delta f=f_1-f_2$ is the heterodyne frequency, and $\omega_1$ and $\omega_2$ are respectively the angular frequency of the first and the second pulses.

Considering the boundary condition, the light field can be expressed as:

$$E(m,n) = \begin{cases} E_2 r_m^n e^{j\theta_m^n}\cdot e^{-j\omega_2 n} + \\ E_1 r_{m+1}^n e^{j\theta_{m+1}^n}\cdot e^{-j\omega_1 n}, & m=1,\ldots,M-1 \\ E_2 r_M^n e^{j\theta_M^n}\cdot e^{-j\omega_2 n}, & m=M \end{cases} \quad (14)$$

iv. The interference intensity of Rayleigh backscattering light of the pulse pair is:

$$I(m,n) = E(m,n)\cdot E(m,n)^* = \quad (15)$$
$$\begin{cases} E_2^2(r_m^n)^2 + E_1^2(r_{m+1}^n)^2 + \\ 2E_1 E_2 r_m^n r_{m+1}^n \cos[\Delta\omega n + (\theta_m^n - \theta_{m+1}^n)], & m=1,\ldots M-1 \\ E_2^2(r_M^n)^2, & m=M \end{cases}$$

In Eq. (15), the Rayleigh scattering coefficient r and the phase retardance $\theta$ are modulated on different terms of the interference intensity of Rayleigh backscattering light by interference modulation, and the terms related to the Rayleigh scattering phase retardance $\theta$ in the interference intensity of Rayleigh backscattering light is zero.

v. The DC term of interference intensity is obtained when a low-pass filter is added to the interference intensity of Rayleigh backscattering light of Eq. (15):

$$I(m,n) = \begin{cases} E_2^2(r_m^n)^2 + E_1^2(r_{m+1}^n)^2, & m=1,\ldots,M-1 \\ E_2^2(r_M^n)^2, & m=M \end{cases} \quad (16)$$

In Eq. (16), the DC term of the interference intensity is only related to the Rayleigh scattering coefficient r. Thus, the Rayleigh scattering coefficient r and the phase retardance $\theta$ are decoupled by filtering to obtain the separate measurement of the two.

vi. The low-pass filter is used for each slice, and the DC term of interference intensity of each slice is obtained one by one, thus a matrix of the square value of Rayleigh scattering coefficient r versus DC light intensity is obtained:

$$\begin{bmatrix} I_{DC}(1,n) \\ I_{DC}(2,n) \\ M \\ I_{DC}(M-1,n) \\ I_{DC}(M,n) \end{bmatrix} = \quad (17)$$

$$E_2^2 \begin{bmatrix} (r_1^n)^2 \\ (r_2^n)^2 \\ M \\ (r_{M-1}^n)^2 \\ (r_M^n)^2 \end{bmatrix} + E_1^2 \begin{bmatrix} (r_2^n)^2 \\ (r_3^n)^2 \\ M \\ (r_M^n)^2 \\ 0 \end{bmatrix} = \begin{bmatrix} E_2^2 & E_1^2 & L & 0 & 0 \\ 0 & E_2^2 & E_1^2 & O & 0 \\ M & O & O & O & M \\ 0 & 0 & O & E_2^2 & E_1^2 \\ 0 & 0 & O & 0 & E_2^2 \end{bmatrix} \begin{bmatrix} (r_1^n)^2 \\ (r_2^n)^2 \\ M \\ (r_{M-1}^n)^2 \\ (r_M^n)^2 \end{bmatrix}$$

Further written as:

$$I_{DC}=ER \quad (18)$$

where $I_{DC}=[I_{DC}(1,n)\ I_{DC}(2,n)\ L\ I_{DC}(M-1,n)\ I_{DC}(M,n)]^T$ is the DC light intensity at different positions. $R=[(r_1{}^n)^2\ (r_2{}^n)^2\ L\ (r_{M-1}{}^n)^2\ (r_M{}^n)^2]^T$ is the square value of Rayleigh scattering coefficient r at different positions. E is the amplitude contained transmission matrix of the pulse pair.

vii. The square value of Rayleigh scattering coefficient is obtained through the matrix of Eq. (18):

$$R = E^{-1} I_{DC} \quad (19)$$

The Rayleigh scattering coefficient r at different positions of the optical fiber under test is obtained by solving the matrix.

viii. Based on the obtained Rayleigh scattering coefficient r, mixing the interference intensity of Rayleigh backscattering light of Eq. (15) with $I_{r1}=\sin(\Delta\omega n)$, and then pass a low-pass filter, the following result is obtained:

$$I_{sr}(m,n) = -E_1 E_2 r_m^n r_{m+1}^n \sin(\theta_m^n - \theta_{m+1}^n) \quad (20)$$

Then mixing the interference intensity of Rayleigh backscattering light of Eq. (15) with $I_{r2}=\cos(\Delta\omega n)$, and then pass a low-pass filter, the following result is obtained:

$$I_{sr2}(m,n) = E_1 E_2 r_m^n r_{m+1}^n \cos(\theta_m^n - \theta_{m+1}^n) \quad (21)$$

By dividing Eq. (20) and Eq. (21) and the arctangent is obtained:

$$\theta(m+1, n) - \theta(m, n) = \arctan\left[\frac{I_{sr1}(m, n)}{I_{sr2}(m, n)}\right] \quad (22)$$

The Rayleigh scattering phase retardance θ at different positions of the optical fiber under test is obtained by recursion calculation of Eq. (22).

Embodiment 3

Figure 4:
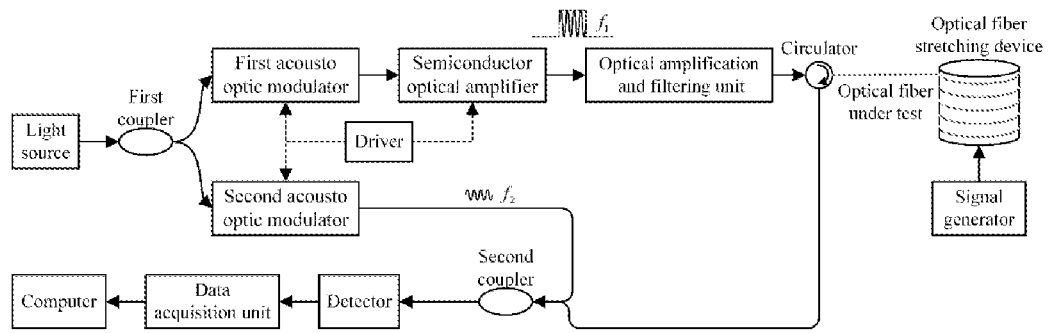
FIG. 4 is the structural diagram of a light scattering parameter measurement system in accordance with an embodiment of the present invention.

This embodiment adopts single pulse scattering and interfere with local light. As shown in FIG. 4, a light scattering parameter measurement system includes: a light source, driver, first and second couplers, first and second acousto-optic modulators, a semiconductor optical amplifier, an optical amplification and filtering unit, a circulator, an optical fiber stretching device, a sound insulation and vibration isolation device, a signal generator, detector, a data acquisition unit, and a computer. The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber. The other channel is frequency shifted by the second acousto-optic modulator as the local light. The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w. The Rayleigh backscattering light generated by the optical fiber under test reaches the second coupler through the third port of the circulator, and the output of the second acousto-optic modulator also reaches the second coupler. The two beams interfere with each other, which is detected by the detector. The interference intensity of Rayleigh backscattering light and local light is collected by the data acquisition unit and transmitted to the computer. The interference intensity of Rayleigh backscattering light and local light is processed by computer using distributed measurement.

This embodiment adopts single pulse scattering and interfere with local light. The light scattering parameter measurement method of the invention comprises the following steps:

1) The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is wound on the optical fiber stretching device, and the optical fiber stretching device is connected with the signal generator, and the signal generator is used to control the optical fiber stretching device to stretch the optical fiber. The other channel is frequency shifted by the second acousto-optic modulator as the local light.

2) The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w.

3) The Rayleigh backscattering light generated by the optical fiber under test reaches the second coupler through the third port of the circulator, and the output of the second acousto-optic modulator also reaches the second coupler. The two beams interfere with each other, which is detected by the detector. The interference light intensity is collected by the data acquisition unit and transmitted to the computer.

4) The interference light intensity is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in} a_i \exp[j(\phi_{in}+\phi_{i0})]$, where $E_{in}$ is the amplitude of the incident light, $\phi_{in}$ is the phase of the incident light, $a_{in}$ is the scattering coefficient of the i-th scattering particle, and $\phi_{i0}$ is the scattering phase. According to the theory of electric dipole, the scattered light caused by each scattering particle is in phase with the incident light, i.e $\phi_{i0}=0$.

ii. Slice model with particle collection is used: The sampling rate of the data acquisition unit is $f_a$, and the forward transmission distance of the pulse is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i = 2\beta z_i$ will be introduced, where β is the wave number and $z_i$ is the position of the i-th scattering particle. If the total length of the optical fiber under test is L and the length of each slice is δl, the optical fiber under test is divided into M=L/δl slices, and the Rayleigh scattering parameters of the m-th slice are $r_m$ and $\theta_m$, where m=1, 2, ..., M. The scattering parameter of the m-th slice is the superposition of scattering particles inside it:

$$r_m e^{j\theta_m} = \sum_{i=1}^{K} a_i e^{j\phi_i} \quad (1)$$

where $r_m$ and $\theta_m$ are the Rayleigh scattering coefficient and phase retardance of the m-th slice, and K is the total number of scattering particles in the m-th slice.

iii. The number of slices covered by a single pulse width is $M_w = w/\delta l$. At the time moment $t_0$, the pulse completely enters the optical fiber under test, and at the time moment $t_1$, the pulse transmits forward a slice. At the time moment $t_M$, the pulse completely leaves the optical fiber under test. The superposition field of Rayleigh backscattering light caused by the pulse and the local light is expressed as:

$$E(m, n) = E_1 \sum_{k=m}^{m+M_w/2-1} r_k^n e^{j(\theta_k^n + \Phi_k^n)} \cdot e^{-j\omega_1 n} + E_2 e^{-j\omega_2 n + j\varphi_0} \quad (23)$$

where n is the discrete sequence of time, i.e. m and n are the discrete sequence of space and time respectively. $E_1$ is the amplitude of the pulse light and $E_2$ is the amplitude of the local light. $\Phi_k^n = 0$ is the phase change induced by external vibration and $\varphi_0$ is the initial phase of the local light. $\Delta\omega = 2\pi\Delta f = \omega_1 - \omega_2$ is the heterodyne angular frequency. $\Delta f = f_1 - f_2$ is the heterodyne frequency, and $\omega_1$ and $\omega_2$ are respectively the angular frequency of the pulse and the local light.

iv. The interference light intensity is:

$$I(m, n) = E(m, n) \cdot E(m, n)^* \quad (24)$$

$$= E_1^2 \sum_{k=m}^{m+M_w/2-1} (r_k^n)^2 + E_2^2 + \quad (24a)$$

$$2E_1^2 \sum_{k,l=m,l>k}^{m+M_w/2-1} r_k^n r_l^n \cos(\Phi_k^n - \Phi_l^n + \theta_k^n - \theta_l^n) + \quad (24b)$$

$$E_1 E_2 \sum_{k=m}^{m+M_w/2-1} r_k^n \cos[\Delta\omega n + \varphi_0 - (\theta_k^n + \Phi_k^n)] \quad (24c)$$

v. The optical fiber stretching device applies a linear stretch to the optical fiber under test, so as to add uniform phase change signals at all positions of the optical fiber under test. The phase change of the m-th slice is expressed as:

$$\varphi(m,n) = \gamma n \quad (25)$$

where $\gamma$ is the phase change rate, which is determined by the stretching rate of the optical fiber stretching device. The accumulated phase change is expressed as:

$$\Phi_k^n - \Phi_l^n = \sum_{m=1}^{k} 2\varphi(m, n) - \sum_{m=1}^{l} 2\varphi(m, n) = 2(k-l)\gamma n \quad (26)$$

Thus the interference light intensity is expressed as:

$$I(m, n) = E_1^2 \sum_{k=m}^{m+M_w/2-1} (r_k^n)^2 + E_2^2 + \quad (27)(27a)$$

$$2E_1^2 \sum_{k,l=m,l>k}^{m+M_w/2-1} r_k^n r_l^n \cos(2(k-l)\gamma n + \theta_k^n - \theta_l^n) + \quad (27b)$$

$$2E_1 E_2 \sum_{k=m}^{m+M_w/2-1} r_k^n \cos[\Delta\omega n + \varphi_0 - (\theta_k^n + 2k\gamma n)] \quad (27c)$$

In Eq. (27), The Rayleigh scattering coefficient r and the phase retardance $\theta$ are modulated on different terms of the interference light intensity by interference modulation. All the summation terms in Eq. (27b) are cosine functions. By controlling the optical fiber stretching device, $2(k-l)\gamma n$ traverses $[0, 2\pi]$, so that the average value of these cosine functions is zero. All the summation terms in Eq. (27c) are cosine functions as well with the average value zero. As a result, the average value of the terms related to the Rayleigh scattering phase retardance $\theta$ of the interference light intensity is zero.

vi. The DC term of the intensity is obtained when a low-pass filter is added to the interference light intensity of Eq. (27):

$$I_{DC}(m, n) = E_1^2 \sum_{k=m}^{m+M_w/2-1} (r_k^n)^2 + E_2^2 \quad (28)$$

In Eq. (28), the DC term of the intensity is only related to the Rayleigh scattering coefficient r. Thus, the Rayleigh scattering coefficient r and the phase retardance $\theta$ are decoupled by filtering to obtain the separate measurement of the two.

vii. The low-pass filter is used for each slice, and the DC term of the intensity of each slice is obtained one by one, thus a matrix of the square value of Rayleigh scattering coefficient r versus DC light intensity is obtained:

$$\begin{bmatrix} I_{DC}(1, n) \\ I_{DC}(2, n) \\ M \\ I_{DC}(M-1, n) \\ I_{DC}(M, n) \end{bmatrix} = E_1^2 \begin{bmatrix} 1 & 1 & L & 0 & 0 \\ 0 & 1 & L & 0 & 0 \\ M & M & O & M & M \\ 0 & 0 & L & 1 & 1 \\ 0 & 0 & L & 0 & 1 \end{bmatrix} \begin{bmatrix} (r_1^n)^2 \\ (r_2^n)^2 \\ M \\ (r_{M-1}^n)^2 \\ (r_M^n)^2 \end{bmatrix} + E_2^2 \quad (29)$$

Further written as:

$$I_{DC} = E_1^2 CR + E_2^2 \quad (30)$$

where $I_{DC} = [I_{DC}(1,n)\ I_{DC}(2,n)\ L\ I_{DC}(M-1,n)\ I_{DC}(M,n)]^T$ is the DC light intensity at different positions. $R = [(r_1^n)^2\ (r_2^n)^2\ L\ (r_{M-1}^n)^2\ (r_M^n)^2]^T$ is the square value of Rayleigh scattering coefficient r at different positions. C is the transmission matrix of the pulse.

viii. The square value of Rayleigh scattering coefficient is obtained through the matrix of Eq. (30):

$$R = \frac{C^{-1}(I_{DC} - E_2^2)}{E_1^2} \quad (31)$$

The Rayleigh scattering coefficient r at different positions of the optical fiber under test is obtained by solving the matrix.

ix. Based on the obtained Rayleigh scattering coefficient r, the optical fiber under test is then placed in the sound insulation and vibration isolation device, so the phase change caused by external vibration is on, $\Phi_k^n = 0$.

x. Mixing the interference light intensity of Eq. (24) with $I'^1 = \sin(\Delta \omega n)$, and then pass a low-pass filter, the following result is obtained:

$$I_{sr1}(m, n) = -E_1 E_2 \sum_{k=m}^{m+M_w/2-1} r_k^n \sin(\varphi_0 - \theta_k^n) \quad (32)$$

Then mixing the interference light intensity of Eq. (24) with $I'^2 = \cos(\Delta \omega n)$, and then pass a low-pass filter, the following result is obtained:

$$I_{sr2}(m, n) = E_1 E_2 \sum_{k=m}^{m+M_w/2-1} r_k^n \cos(\varphi_0 - \theta_k^n) \quad (33)$$

Combining the obtained Rayleigh scattering coefficient r into Eq. (32) and Eq. (33), the Rayleigh scattering phase retardance θ at different positions of the optical fiber under test is obtained by matrix operation.

Embodiment 4

In this embodiment, the pulse width in the single pulse scattering and interfere with local light is twice the length of the slice. The optical fiber under test is placed in a sound insulation and vibration isolation device, and the optical fiber stretching device is not required. The other components are the same as the embodiment 3.

This embodiment adopts single pulse scattering and interfere with local light while the pulse width is twice the length of the slice. The light scattering parameter measurement method can include the following steps:

1) The continuous light with frequency $f_0$ emitted by the light source is divided into two channels by the first coupler. The first channel is frequency shifted by the first acousto-optic modulator, then modulated into pulse light by the semiconductor optical amplifier. The pulse light is amplified and filtered by the optical amplification and filtering unit, and then injected into the first port of the circulator, and the second port of the circulator is connected with the optical fiber under test. The optical fiber under test is placed in the sound insulation and vibration isolation device. The other channel is frequency shifted by the second acousto-optic modulator as the local light.

2) The driver controls the first and the second acousto-optic modulators to shift the frequency of the light wave and controls the semiconductor optical amplifier to generate pulse signal. The frequency of the light emitted from the first and the second acousto-optic modulators are $f_1$ and $f_2$ respectively, and the pulse width after passing through the semiconductor optical amplifier is w.

3) The Rayleigh backscattering light generated by the optical fiber under test reaches the second coupler through the third port of the circulator, and the output of the second acousto-optic modulator also reaches the second coupler. The two beams interfere with each other, which is detected by the detector. The interference light intensity is collected by the data acquisition unit and transmitted to the computer.

4) The interference light intensity is processed by computer using distributed measurement:

i. The optical fiber under test is composed of randomly distributed scattering particles, whose diameter is far less than the wavelength of incident light. When the light wave is scattered by the i-th scattering particle, the scattered light field is expressed as $E_{in} a_i \exp[j(\phi_{in} + \phi_{i0})]$, where $E_{in}$ is the amplitude of the incident light, $\phi_{in}$ is the phase of the incident light, $a_{in}$ is the scattering coefficient of the i-th scattering particle, and $\phi_{i0}$ is the scattering phase. According to the theory of electric dipole, the scattered light caused by each scattering particle is in phase with the incident light, i.e $\phi_{i0} = 0$.

ii. Slice model with particle collection is used: The sampling rate of the data acquisition unit is $f_a$, and the forward transmission distance of the pulse is $\delta l = c/(n_r f_a)$ at each sampling, where c is the speed of light in vacuum and $n_r$ is the refractive index of the optical fiber. Taking this transmission distance as the length of a slice, the optical fiber under test is divided into many slices. Due to the random position of scattering particles, when a large amount of scattered light in the slice is emitted backward, different phase $\phi_i = 2\beta z_i$ will be introduced, where β is the wave number and $z_i$ is the position of the i-th scattering particle. If the total length of the optical fiber under test is L and the length of each slice is δl, the optical fiber under test is divided into $M = L/\delta l$ slices. The number of slices covered by a single pulse width is $M_w = w/\delta l$, and the relationship between the pulse width w and the sampling rate $f_a$ of the data acquisition unit is $w f_a = 2c/n_r$, that is the pulse width is twice the length of the slice, i.e. $M_w = 2$. The Rayleigh scattering parameters of the m-th slice are r, and $\theta_m$, where m=1, 2, . . . , M. The scattering parameter of the m-th slice is the superposition of scattering particles inside it:

$$r_m e^{j\theta_m} = \sum_{i=1}^{K} a_i e^{j\phi_i} \quad (1)$$

where $r_m$ and $\theta_m$ are the Rayleigh scattering coefficient and phase retardance of the m-th slice, and K is the total number of scattering particles in the m-th slice.

iii. The optical fiber under test is placed in the sound insulation and vibration isolation device, so the phase change caused by external vibration is $\Phi_k^n = 0$. In addition, $w f_a = 2c/n_r$, i.e. the number of slices covered by a single pulse width is $M_w = 2$. The superposition field of Rayleigh backscattering light caused by the pulse and the local light is expressed as:

$$E(m,n) = E_1 r_k^n e^{j\theta_k^n} e^{-j\omega_1 n} + E_2 e^{-j\omega_2 n + j\varphi_0} \quad (34)$$

where n is the discrete sequence of time, i.e. m and n are the discrete sequence of space and time respectively. $E_1$ is the amplitude of the pulse light and $E_2$ is the amplitude of the local light. $\varphi_0$ is the initial phase of the local light. $\Delta\omega = 2\pi\Delta f = \omega_1 - \omega_2$ is the heterodyne angular frequency.

$\Delta f=f_1-f_2$ is the heterodyne frequency, and $\omega_1$ and $\omega_2$ are respectively the angular frequency of the pulse and the local light.

iv. The interference light intensity is:

$$I(m,n)=E_1^2(r_m^n)^2+E_2^2+2E_1E_2r_m^n \cos[\Delta\omega n+\varphi_0-\theta_m^n] \quad (35)$$

v. The DC term of the intensity is obtained when a low-pass filter is added to the interference light intensity of Eq. (35):

$$I(m,n)=E_1^2(r_m^n)^2+E_2^2 \quad (36)$$

In Eq. (36), the DC term of the intensity is only related to the Rayleigh scattering coefficient r. Thus, the Rayleigh scattering coefficient r and the phase retardance $\theta$ are decoupled by filtering to obtain the separate measurement of the two.

vi. The low-pass filter is used for each slice, and the DC term of the intensity of each slice is obtained one by one, thus a matrix of the square value of Rayleigh scattering coefficient r versus DC light intensity is obtained:

$$\begin{bmatrix} I_{DC}(1,n) \\ I_{DC}(2,n) \\ M \\ I_{DC}(M-1,n) \\ I_{DC}(M,n) \end{bmatrix} = E_1^2 \begin{bmatrix} (r_1^n)^2 \\ (r_2^n)^2 \\ M \\ (r_{M-1}^n)^2 \\ (r_M^n)^2 \end{bmatrix} + E_2^2 \quad (37)$$

Further written as:

$$I_{DC}=E_1^2 R+E_2^2 \quad (38)$$

where $I_{DC}=[I_{DC}(1,n)\ I_{DC}(2,n)\ L\ I_{DC}(M-1,n)\ I_{DC}(M,n)]^T$ is the DC light intensity at different positions. $R=[(r_1^n)^2\ (r_2^n)^2\ L\ (r_{M-1}^n)^2\ (r_M^n)^2]^T$ is the square value of Rayleigh scattering coefficient r at different positions.

vii. The square value of Rayleigh scattering coefficient is obtained through the matrix of Eq. (38):

$$R=\frac{I_{DC}-E_2^2}{E_1^2} \quad (39)$$

The Rayleigh scattering coefficient r at different positions of the optical fiber under test is obtained by solving the matrix.

viii. Based on the obtained Rayleigh scattering coefficient r, mixing the interference light intensity of Eq. (35) with $I_{r1}=\sin(\Delta\omega n)$, and then pass a low-pass filter, the following result is obtained:

$$I_{sr}(m,n)=-E_1E_2r_m^n \sin(\varphi_0-\theta_m^n) \quad (40)$$

Then mixing the interference light intensity of Eq. (35) with $I_{r2}=\cos(\Delta\omega n)$, and then pass a low-pass filter, the following result is obtained:

$$I_{sr2}(m,n)=E_1E_2r_m^n \cos(\varphi_0-\theta_m^n) \quad (41)$$

By dividing Eq. (40) and Eq. (41) and the arctangent is obtained:

$$\theta(m,n) = \arctan\left[\frac{I_{sr1}(m,n)}{I_{sr2}(m,n)}\right]+\varphi_0 \quad (42)$$

The Rayleigh scattering phase retardance $\theta$ at different positions of the optical fiber under test is obtained by recursion calculation of Eq. (42).

Furthermore, based on the measured Rayleigh scattering coefficient r and phase retardance $\theta$, the distributed temperature and strain sensing is obtained by using these parameters. Specifically, the corresponding relations of Rayleigh scattering coefficient r and phase retardance $\theta$ with temperature and strain are calibrated respectively in the thermostat and strain stretching device, and the following expressions are obtained:

$$\Delta r(z)=C_{11}\Delta T(z)+C_{12}\Delta\varepsilon(z) \quad (43)$$

$$\Delta\theta(z)=C_{21}\Delta T(z)+C_{22}\Delta\varepsilon(z) \quad (44)$$

where $\Delta r(z)$ and $\Delta\theta(z)$ are the variations of Rayleigh scattering coefficient and phase retardance at position z of the optical fiber under test respectively. $\Delta T(z)$ and $\Delta\varepsilon(z)$ are the variations of temperature and strain at position z of the optical fiber under test respectively. $C_{11}$, $C_{12}$, $C_{21}$ and $C_{22}$ are the coefficients of variation. Eq. (43) and Eq. (44) can be written in matrix form:

$$\begin{bmatrix} \Delta r(z) \\ \Delta\theta(z) \end{bmatrix} = \begin{bmatrix} C_{11} & C_{12} \\ C_{21} & C_{22} \end{bmatrix} \begin{bmatrix} \Delta T(z) \\ \Delta\varepsilon(z) \end{bmatrix} \quad (45)$$

The transfer coefficient matrix of Rayleigh scattering coefficient and phase retardance with temperature and strain is calculated as:

$$C_{T\varepsilon} = \begin{bmatrix} C_{11} & C_{12} \\ C_{21} & C_{22} \end{bmatrix} \quad (46)$$

The variation of Rayleigh scattering coefficient $\Delta r'(z)$ and phase retardance $\Delta\theta'(z)$ are obtained in one measurement. By using the transfer coefficient matrix, the variation of temperature and strain can be calculated as:

$$\begin{bmatrix} \Delta T'(z) \\ \Delta\varepsilon'(z) \end{bmatrix} = C_{T\varepsilon}^{-1} \begin{bmatrix} \Delta r'(z) \\ \Delta\theta'(z) \end{bmatrix} \quad (47)$$

Although the present invention has been described with respect to specific embodiments thereof, it is to be understood that modifications and variations can be made within the scope of the invention.

What is claimed is:

1. A light scattering parameter measurement system using dual-pulse scattering interference, comprising:
   a light source configured to emit a continuous light at frequency $f_0$;
   a modulation unit configured to modulate the continuous light into a pulse pair comprising two pulses at frequencies $f_1$ and $f_2$ respectively;
   an optical amplification and filtering unit configured to amplify and filter the pulse pair;
   a circulator comprising a first port, a second port, and a third port, wherein the first port is configured to receive the pulse pair from the optical amplification and filtering unit, wherein the second port is connected with an optical fiber under test
   wherein the optical fiber under test is wound on an optical fiber stretching device controlled by a signal generator, wherein the optical fiber under test comprises randomly distributed scattering particles having diameters less than wavelength of the continuous light;

a detector configured to receive a Rayleigh backscattering light in the optical fiber under test generated by the pulse pair via the third port of the circulator, wherein the Rayleigh backscattering light produces interference at the detector, wherein the detector is configured to output interference intensity of the Rayleigh backscattering light; and a computer processor configured to process the interference intensity of the Rayleigh backscattering light using a distributed measurement model to obtain a Rayleigh scattering coefficient r and a phase retardance θ of the Rayleigh backscattering light, wherein the distributed measurement model divides the optical fiber under test into a plurality of slices having a slice length and calculates the Rayleigh scattering coefficient r and the phase retardance θ of the Rayleigh backscattering light at each of the plurality of slices, wherein the Rayleigh scattering coefficient r and the phase retardance θ are modulated in different terms of the interference intensity of the Rayleigh backscattering light by interference modulation, wherein the optical fiber stretching device is configured to apply a linear stretch to the optical fiber under test, which adds uniform phase change signals at positions along the optical fiber under test, which renders an average value of terms related to the Rayleigh scattering phase retardance θ to be zero, which decouples the Rayleigh scattering coefficient r from the Rayleigh scattering phase retardance θ.

2. The light scattering parameter measurement system of claim 1, wherein the distributed measurement model divides the optical fiber under test into M slices, and M is an integer, and each the M slices has the slice length $\delta l = c/(n_r f_a)$, in which $f_a$ is a sampling rate, c is the speed of light in vacuum, and $n_r$ is the refractive index of the optical fiber, wherein $M = L/\delta l$ in which L is the total length of the optical fiber under test, wherein the Rayleigh scattering coefficient r and the phase retardance θ of an m-th slice are $r_m$ and $\theta_m$ respectively, where m=1, 2, ..., M.

3. The light scattering parameter measurement system of claim 1, wherein the two pulses have pulse widths two times the slice length.

4. The light scattering parameter measurement system of claim 1, wherein a DC component of the interference intensity of the Rayleigh backscattering light is obtained by a low-pass filter, to obtain the Rayleigh scattering coefficient r.

5. The light scattering parameter measurement system of claim 4, wherein the low-pass filter is applied to the interference intensity of the Rayleigh backscattering light at each of the plurality of slice to obtain a DC component of the interference intensity of the Rayleigh backscattering light of individual slices, which obtains a matrix of a square value of the Rayleigh scattering coefficient r versus DC light intensity.

6. The light scattering parameter measurement system of claim 5, wherein the matrix is solved to obtain the Rayleigh scattering coefficient r at different positions of the optical fiber under test, wherein the Rayleigh scattering phase retardance θ at different positions of the optical fiber under test is obtained by a matrix operation using the obtained Rayleigh scattering coefficient r.

7. The light scattering parameter measurement system of claim 6, wherein the interference intensity of the Rayleigh backscattering light is mixed with specific signals before being filtered by a low-pass filter.

8. The light scattering parameter measurement system of claim 1, further comprising:

a thermostat and strain stretching device configured to calibrate relations of Rayleigh scattering coefficient r and phase retardance θ with temperature and strain respectively, wherein the thermostat and strain stretching device is configured to compute a temperature distribution or a strain distribution across the plurality of slices along the optical fiber under test using the relations and the Rayleigh scattering coefficient r and the phase retardance θ of the Rayleigh backscattering light obtained by the distributed measurement model.

9. The light scattering parameter measurement system of claim 1, wherein the optical fiber under test is isolated from sound and vibrations to minimize phase changes caused by external vibrations.

10. The light scattering parameter measurement system of claim 1, wherein the modulation unit comprises a driver and an acousto-optic modulator, wherein the driver is configured to generate an electric driving signal, wherein an output of the driver is connected with an control port of the acousto-optic modulator, wherein the pulses with frequency shift and time delay are generated by the driver to drive the acousto-optic modulator, wherein the acousto-optic modulator is configured to output the pulse pair at frequencies $f_1$ and $f_2$ respectively and having pulse width w.

11. The light scattering parameter measurement system of claim 1, wherein the modulation unit comprises a semiconductor optical amplifier, first and second couplers, a first acousto-optic modulator and a second acousto-optic modulator, a delay fiber, and a driver, wherein the semiconductor optical amplifier is connected to the first acousto-optic modulator and the second acousto-optic modulator by the first couple, wherein an output end of the second acousto-optic modulator is connected with the delay fiber, which combines with an output end of the first acousto-optic modulator to be connected to the second coupler, wherein the driver is connected to the semiconductor optical amplifier, the first acousto-optic modulator and the second acousto-optic modulator, wherein an input is firstly modulated into pulse signals by the semiconductor optical amplifier, and divided into two channels through the first coupler, one through the first acousto-optic modulator, the other through the second acousto-optic modulator and a length of delay fiber, wherein the delay fiber has a length w, wherein the two channels are combined into one output through the second coupler, which outputs the pulse pair, wherein lights of the two channels are at frequencies $f_1$ and $f_2$ respectively, wherein the driver controls the semiconductor optical amplifier to generate pulse signal, and controls the first acousto-optic modulator and the second acousto-optic modulator to shift frequency of lights therein.

12. The light scattering parameter measurement system of claim 1, wherein the modulation unit comprises a first semiconductor optical amplifier and a second semiconductor optical amplifier, a first acousto-optic modulator and a second acousto-optic modulator, first and second couplers, and a driver, wherein output ports of the first coupler are respectively connected to the first semiconductor optical amplifier and the second semiconductor optical amplifier, wherein the first acousto-optic modulator and the second acousto-optic modulator are respectively connected to the first semiconductor optical amplifier and the second semiconductor optical amplifier, wherein output ports of the first semiconductor optical amplifier and the second semiconductor optical amplifier are connected to the second coupler, and the driver is respectively connected to the first and the second acousto-optic modulators and the first and the second semiconductor optical amplifiers, wherein an input is divided into two channels through the first coupler, wherein a first channel one generates frequency shift by the first acousto-optic modulator and modulates the light into pulse by the first semiconductor optical amplifier, wherein a second channel generates frequency shift by the second acousto-optic modulator and modulates the light into pulse by the second semiconductor optical amplifier, wherein time of pulse generation is controlled by the driver so that the two pulses have a delay time, wherein a first pulse sent by the driver to the second semiconductor optical amplifier is delayed by w than a second pulse sent to the first semiconductor optical amplifier, wherein the first channel and the second channel are combined into one output through the second coupler, to produce the pulse pair, wherein frequencies of lights in the two channels are $f_1$ and $f_2$ respectively.

13. A light scattering parameter measurement system using single pulse scattering and interfere with a local light, comprising:

a light source configured to emit a continuous light at frequency $f_0$;

a first coupler configured to divide the continuous light into a first channel and a second channel;

a second coupler;

a first acousto-optic modulator configured to shift light frequency in the first channel;

a second acousto-optic modulator configured to shift light frequency in the second channel as a local light, wherein lights emitted from the first acousto-optic modulator and the second acousto-optic modulator are at frequencies $f_1$ and $f_2$ respectively;

a semiconductor optical amplifier configured to modulate light in the first channel into a pulse light;

a driver configured to control the first acousto-optic modulator and the second acousto-optic modulator to shift frequencies of lights therein and to control the semiconductor optical amplifier to output the pulse light having a pulse width w;

an optical amplification and filtering unit configured to amplify and filter the pulse light;

a circulator comprising a first port, a second port, and a third port, wherein the first port is configured to receive the pulse light from the optical amplification and filtering unit, wherein the second port is connected with an optical fiber under test, wherein a Rayleigh backscattering light in the optical fiber under test generated by the pulse light reaches the second coupler through the third port of the circulator from the first channel, wherein an output of the second acousto-optic modulator from the second channel reaches the second coupler, which produces light interference with the Rayleigh backscattering light wherein the optical fiber under test is wound on a optical fiber stretching device controlled by a signal generator;

a detector configured to detect the light interference of the Rayleigh backscattering light and the local light, wherein the detector is configured to output interference intensity of the Rayleigh backscattering light; and a computer processor configured to process the interference intensity of the Rayleigh backscattering light and the local light using a distributed measurement model to obtain a Rayleigh scattering coefficient r and a phase retardance $\theta$ of the Rayleigh backscattering light, wherein the distributed measurement model divides the optical fiber under test into a plurality of slices having a slice length and calculates the Rayleigh scattering coefficient r and the phase retardance $\theta$ of the Rayleigh backscattering light at each of the plurality of slices, wherein the Rayleigh scattering coefficient r and the phase retardance $\theta$ are modulated in different terms of the interference intensity of the Rayleigh backscattering light and the local light by interference modulation, wherein the optical fiber stretching device is configured to apply a linear stretch to the optical fiber under test, which adds uniform phase change signals at positions along the optical fiber under test, which renders an average value of terms related to the Rayleigh scattering phase retardance $\theta$ to be zero, which decouples the Rayleigh scattering coefficient r from the Rayleigh scattering phase retardance $\theta$.

14. The light scattering parameter measurement system of claim 13, wherein a DC component of the interference intensity of the Rayleigh backscattering light and the local light is obtained by a low-pass filter, to obtain the Rayleigh scattering coefficient r.

15. The light scattering parameter measurement system of claim 14, wherein the low-pass filter is applied to the interference intensity of the Rayleigh backscattering light and the local light at each of the plurality of slice to obtain a DC component of the interference intensity of the Rayleigh backscattering light and the local light of individual slices, which obtains a matrix of a square value of Rayleigh scattering coefficient r versus DC light intensity.

16. The light scattering parameter measurement system of claim 15, wherein the matrix is solved to obtain the Rayleigh scattering coefficient r at different positions of the optical fiber under test, wherein the Rayleigh scattering phase retardance $\theta$ at different positions of the optical fiber under test is obtained by a matrix operation using the obtained Rayleigh scattering coefficient r.

17. The light scattering parameter measurement system of claim 13, further comprising:

a thermostat and strain stretching device configured to calibrate relations of Rayleigh scattering coefficient r and phase retardance $\theta$ with temperature and strain respectively, wherein the thermostat and strain stretching device is configured to compute a temperature distribution or a strain distribution across the plurality of slices along the optical fiber under test using the relations and the Rayleigh scattering coefficient r and the phase retardance $\theta$ of the Rayleigh backscattering light obtained by the distributed measurement model.

18. The light scattering parameter measurement system of claim 13, wherein the optical fiber under test is isolated from sound and vibrations to minimize phase changes caused by external vibrations.

19. The light scattering parameter measurement system of claim 13, wherein the two pulses have pulse widths two times the slice length.

* * * * *